(12) United States Patent
Fujimaki et al.

(10) Patent No.: US 6,507,543 B2
(45) Date of Patent: Jan. 14, 2003

(54) OPTICAL DISK APPARATUS AND GALVANO-MIRROR USED FOR THE SAME

(75) Inventors: Tohru Fujimaki, Kawasaki (JP); Haruhiko Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/771,826

(22) Filed: Jan. 29, 2001

(65) Prior Publication Data

US 2001/0014059 A1 Aug. 16, 2001

(30) Foreign Application Priority Data

Feb. 16, 2000 (JP) ........................................ 2000-038359
Oct. 2, 2000 (JP) ........................................ 2000-301785

(51) Int. Cl.$^7$ ................................................ G11B 7/00
(52) U.S. Cl. ................................ 369/44.19; 369/44.14; 369/112.01; 369/119
(58) Field of Search ........................... 369/44.14, 44.15, 369/44.17, 44.18, 44.19, 44.21, 44.22, 44.23, 44.28, 112.01, 112.09, 112.14, 112.21, 112.29, 119

(56) References Cited

U.S. PATENT DOCUMENTS 5,563,871 A * 10/1996 Bargerhuff et al. ...... 369/44.17
6,333,910 B1 * 12/2001 Nishikawa et al. ..  369/44.28 X

FOREIGN PATENT DOCUMENTS

JP 11-213419 8/1999

* cited by examiner

*Primary Examiner*—Muhammad Edun
(74) *Attorney, Agent, or Firm*—Greer, Burns & Crain, Ltd.

(57) ABSTRACT

An optical disk apparatus includes a light source, an objective lens, a slider to hold the lens, a suspension to support the slider, a mirror located below the slider, and a seek mechanism to move the mirror and the slider in the tracking direction of an optical disk to be used. The mirror upwardly reflects light traveling in a predetermined horizontal direction, thereby causing the reflected light to enter the objective lens arranged above the mirror. The mirror is rotatable about a prescribed axis for causing the reflected light to shift in the above-mentioned horizontal direction.

17 Claims, 27 Drawing Sheets

FIG.16
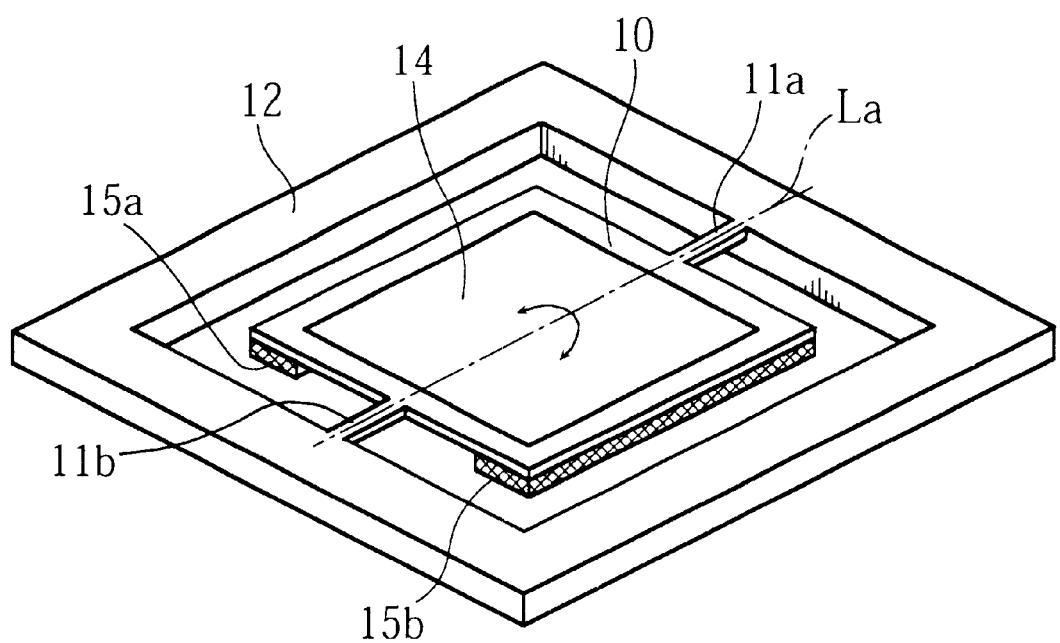
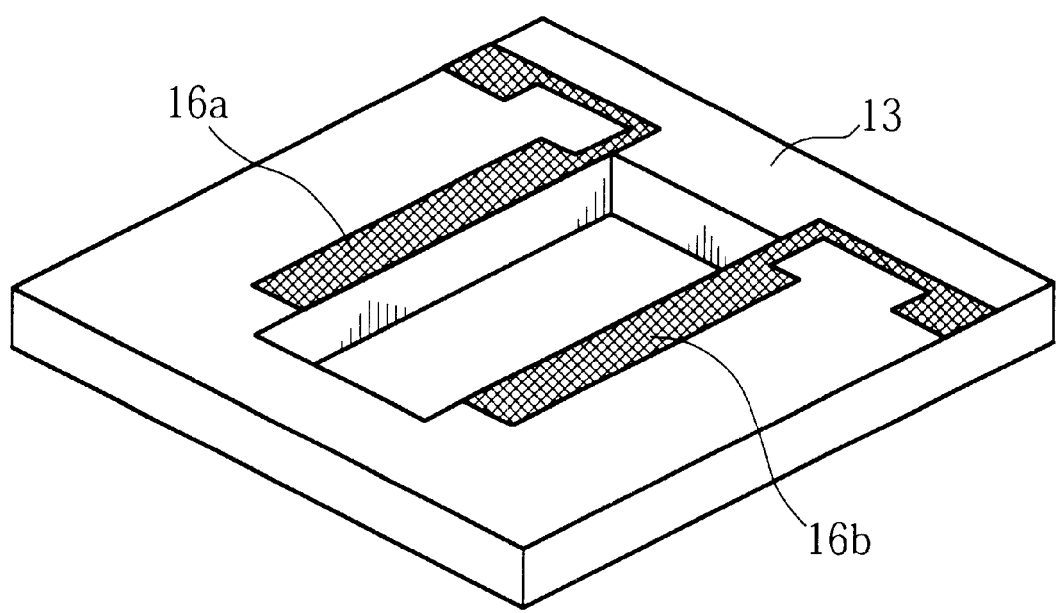

OPTICAL DISK APPARATUS AND GALVANO-MIRROR USED FOR THE SAME

BACKGROUND OF THE INVENTION

1. Field of the Invention

The present invention relates to an optical disk apparatus used for performing data-processing with optical disks. The data-processing may include recording, reading or deleting of data. The optical disk may include a magneto-optical disk with which magnetic field modulation or optical pulse modulation may be used for performing required data-processing.

2. Description of the Related Art

FIGS. 36 and 37 of the accompanying drawings show a conventional disk apparatus disclosed in JP-A-11(1999)-213419. As illustrated, the conventional apparatus includes an elongated swing arm 90, a flexible suspension 91, a fine adjustment actuator 92, a mirror 93 and a slider 94. The suspension 91 is attached, at one end, to the swing arm 90, while carrying, at the other end, the actuator 92, the mirror 93 and the slider 94. The swing arm 90 is attached to a spindle 95 which in turn is connected to a motor Ma. Upon turning on the motor Ma, the swing arm 90 is caused to rotate forward or backward about the axis of the spindle 95, whereby the slider 94, together with the actuator 92 and the mirror 93, is moved in the tracking direction Tg over the disk D. The fine adjustment actuator 92 is designed to make fine adjustments to the position of the mirror 93 and the slider 94 in the tracking direction Tg. As shown in FIG. 37, the slider 94 carries a lens assembly consisting of two objectives 96.

Further, the conventional apparatus includes a spindle motor Mb arranged below the disk D. In operation, the disk D is rotated at high speed by the motor Mb. The rotation of the disk D causes air to be drawn between the slider 94 and the disk D, whereby the slider 94 floats above the disk D due to the air introduced between the slider 94 and the disk D.

The conventional disk apparatus also includes a light source 97 to emit a laser beam and a mirror 98 disposed in the path of the laser beam. As shown in FIG. 36, the laser beam is reflected on the mirror 98, to travel toward the other mirror 93. The laser beam is reflected on the mirror 93, to be directed downward and enter the objectives 96. The objectives 96 focus the laser beam and form a beam spot on the recording layer of the disk D.

The seeking operation of a desired one of the tracks of the disk D is performed while the swing arm 90 is being caused to pivot on the spindle 95. Once the required track is found, the beam spot may need to remain on the target track for a while. For this purpose, tracking control is carried out by driving the fine actuator 92 for finely adjusting the position of the mirror 93 and the slider 94 in the tracking direction Tg, so that the mirror 93 and the slider 94 can follow the deviation of the target track.

Though provided with the fine actuator designed to move the relevant components in the tracking direction Tg, the conventional optical disk apparatus has been found disadvantageous in the following points.

When the disk D is rotated at high speed, the disk surface may fluctuate in the focusing direction shown by an arrow Fs in FIG. 37. The fluctuation may be caused by unstable rotation of the disk spindle, initial geometrical error of the disk D or warping of the disk D due to gravity.

When such fluctuation occurs in the disk D, the slider 94 will rise and fall to maintain the prescribed constant distance between the disk surface and the slider 94. Hence, the mirror 93, mounted on the slider 94, also moves up and down. On the other hand, the level of the laser beam traveling toward the mirror 93 does not change. This means that the height of the laser beam relative to the mirror 93 is not constant during the fluctuation of the disk D.

Specifically, it is assumed that normally (i.e., with no disk fluctuation), the center C1 of the laser beam strikes upon apoint n1 of the mirror 93, as shown in FIG. 37. However, when the disk D moves downward, as shown in FIG. 38, the center of the laser beam (C2) strikes upon a higher point n2 on the mirror 93. As a result, the light path extending from the mirror 93 to the objectives 96 will shift toward the spindle 95 (see arrow Na). Likewise, when the disk D moves upward, the light path will shift in the opposite direction or away from the spindle 95.

When such shifting of the light path occurs, the center of the laser beam will deviate from the optical axis of the objectives 96, which may make it difficult or even impossible to properly form an appropriately small beam spot on the recording layer of the disk D. In particular, when a small, solid immersion lens is used for the lower objective 96a of the lens assembly, the laser beam may utterly miss the lower lens 96a. It should be noted here that the fine actuator 92 cannot help to solve the problems, since the actuator 92 moves the mirror 93 and the slider 94 only in the tracking direction Tg (FIG. 36), which is perpendicular to the shifting direction Na of the light path.

SUMMARY OF THE INVENTION

The present invention has been proposed under the circumstances described above, and its object is to overcome the conventional problems stemming from the fluctuation of an optical disk, so that data-recording operation or data-reading operation with an optical disk is properly performed.

According to a first aspect of the present invention, there is provided an optical disk apparatus which includes: a light source for emitting a laser beam; an objective for focusing the laser beam; a slider holding the objective and arranged to float relative to an optical disk; a suspension for supporting the slider; a first mirror supported by the suspension and spaced from the slider in a focusing direction, the first mirror being arranged to reflect the laser beam traveling in a first direction which is non-parallel to the focusing direction, so that the reflected laser beam enters the objective; and a seek mechanism for moving the suspension so that the first mirror and the slider are moved in a tracking direction. The first mirror is rotatable about a first axis for causing the reflected laser beam to shift in the first direction.

Preferably, the first mirror may be rotatable about a second axis which is non-parallel to the first axis for causing the reflected laser beam to shift in a second direction which is non-parallel to the first direction.

Preferably, the apparatus of the present invention may further include a second mirror for reflecting the laser beam between the light source and the first mirror. The second mirror may be rotatable about a third axis for causing the reflected laser beam to shift in a third direction which is non-parallel to the first direction.

According to a second aspect of the present invention, there is provided an optical disk apparatus which includes: a light source for emitting a laser beam; an objective for focusing the laser beam; a slider holding the objective and arranged to float relative to an optical disk; a suspension for supporting the slider; a first mirror supported by the suspension and spaced from the slider in a focusing direction, the first mirror being arranged to reflect the laser beam traveling in a first direction which is non-parallel to the focusing direction, so that the reflected laser beam enters the objective; a seek mechanism for moving the suspension so that the first mirror and the slider are moved in a tracking direction; and a second mirror disposed between the light source and the first mirror for reflecting the laser beam emitted by the light source toward the first mirror. The second mirror is rotatable about a first axis for causing the reflected laser beam to shift in the focusing direction.

Preferably, the second mirror may be rotatable about a second axis for causing the reflected laser beam to shift in a second direction which is non-parallel to the first direction.

In a preferred embodiment of the present invention, the first mirror may be rotatable about a third axis for causing the reflected laser beam to shift in a third direction which is non-parallel to the first direction.

Preferably, the seek mechanism may include a swing arm for moving the suspension in the tracking direction. The first direction may be non-parallel to the tracking direction.

The above apparatus may further include a detector for receiving the laser beam which is reflected on the disk and returned along a return path. The detector is designed to generate a tracking error detection signal when the return path deviates in a tracking error direction. The detector is designed to generate a beam shift detection signal when the return path deviates in a beam shift direction.

Preferably, the detector may be provided with a photoelectric device and an arithmetical unit. The photoelectric device may include at least first to fourth light-receiving elements, wherein the first and the second light-receiving elements are spaced from the third and the fourth light-receiving elements in the beam shift detection. In addition, the first and the third light-receiving elements may be spaced from the second and the fourth light-receiving elements in the tracking error direction. The arithmetical unit may be arranged to generate the tracking error detection signal based on a difference between a sum of signals from the first and the third light-receiving elements and a sum of signals from the second and the fourth light-receiving elements. In addition, the arithmetical unit is arranged to generate the beam shift detection signal based on a difference between a sum of signals from the first and the second light-receiving elements and a sum of signals from the third and the fourth light-receiving elements.

In a preferred embodiment of the present invention, the seek mechanism may cause the suspension to be moved linearly in the tracking direction. The first direction may coincide with the tracking direction.

In a preferred embodiment of the present invention, the apparatus may include a photoelectric device supported by the suspension, wherein the photoelectric device is formed with a through-hole for allowing passage of the laser beam. The photoelectric device is designed to detect deviation of the laser beam relative to the through-hole in the focusing direction.

In the above case, the photoelectric device may be provided with at least two light-receiving elements spaced from each other in the focusing direction, wherein the through-hole may intervene between the two light-receiving elements.

In addition, the above apparatus may further include an arithmetical unit designed to generate a beam shift detection signal based on a difference between signals supplied from the light-receiving elements.

According to a third aspect of the present invention, there is provided an optical disk apparatus which includes: a light source for emitting a laser beam; an objective for focusing the laser beam; a slider holding the objective and arranged to float relative to an optical disk; a suspension for supporting the slider; a mirror supported by the suspension and spaced from the slider in a focusing direction, the mirror being arranged to reflect the laser beam traveling in a first direction which is non-parallel to the focusing direction, so that the reflected laser beam enters the objective; a seek mechanism for moving the suspension so that the mirror and the slider are moved in a tracking direction; and position adjusting means for finely moving the slider and the mirror in the first direction.

In the above apparatus, the seek mechanism may include a carriage to which the suspension is connected, a carriage guide elongated in the tracking direction and a voice coil motor for driving the carriage along the carriage guide.

Preferably, the carriage may include a casing supported by the carriage guide and a supporting plate to which the suspension is connected. The supporting plate is movable relative to the casing and connected to the voice coil motor.

The apparatus of the present invention may further include a mirror holder supported by the suspension, and a gimbal spring arranged between the mirror holder and the slider so that the slider is pivotable on the mirror holder.

In a preferred embodiment of the present invention, the suspension may include two flexible plates held in parallel to each other.

According to a fourth aspect of the present invention, there is provided an optical disk apparatus which includes: a light source for emitting a laser beam; an objective for focusing the laser beam; a slider holding the objective and arranged to float relative to an optical disk; a suspension for supporting the slider; a mirror supported by the suspension and spaced from the slider in a focusing direction, the mirror being arranged to reflect the laser beam traveling in a first direction which is non-parallel to the focusing direction, so that the reflected laser beam enters the objective; a seek mechanism for moving the suspension so that the mirror and the slider are moved in a tracking direction; a mirror holder supported by the suspension for holding the mirror; and a gimbal spring disposed between the mirror holder and the slider for allowing the slider to pivot on the mirror holder.

According to a fifth aspect of the present invention, there is provided a galvano-mirror which includes: a mirror plate provided with a light reflector; a supporting member for supporting the mirror plate; a torsion bar for connecting the mirror plate to the supporting member in a cantilever manner, the torsion bar being twistable about a first axis; first actuating means for rotating the mirror plate about the first axis of the torsion bar; and second actuating means for rotating the mirror plate about a second axis which is non-parallel to the first axis.

Other features and advantages of the present invention will become apparent from the detailed description given below with reference to the accompanying drawings.

BRIEF DESCRIPTION OF THE DRAWINGS

FIG. 16 is an exploded view showing a single-axis galvano-mirror used for the apparatus of FIG. 13;

DETAILED DESCRIPTION OF THE PREFERRED EMBODIMENTS

The preferred embodiments of the present invention will be described below with reference to the accompanying drawings.

Figure 1:
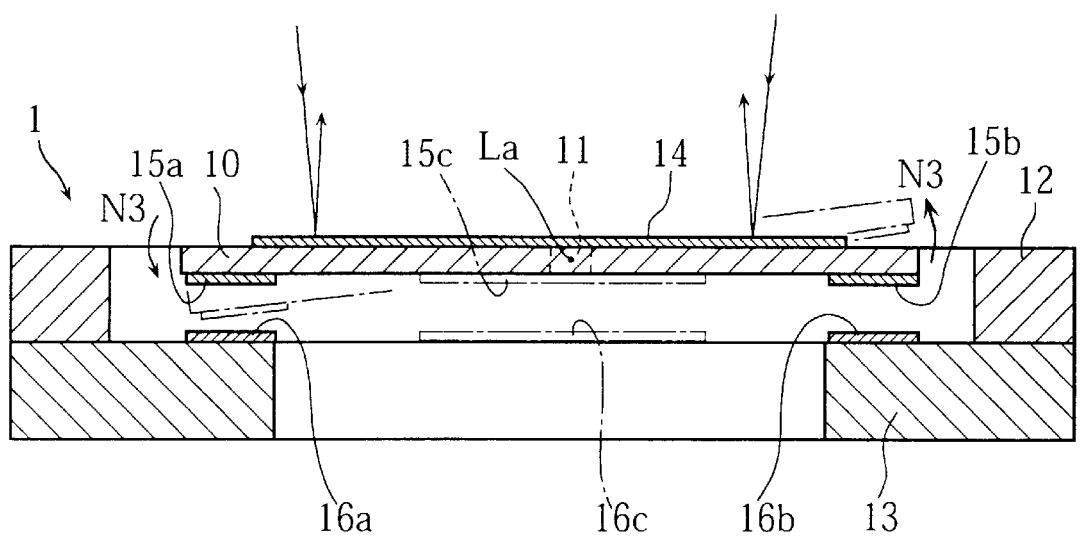
FIG. 1 is a sectional view showing a galvano-mirror used for an optical disk apparatus embodying the present invention.
Figure 2:
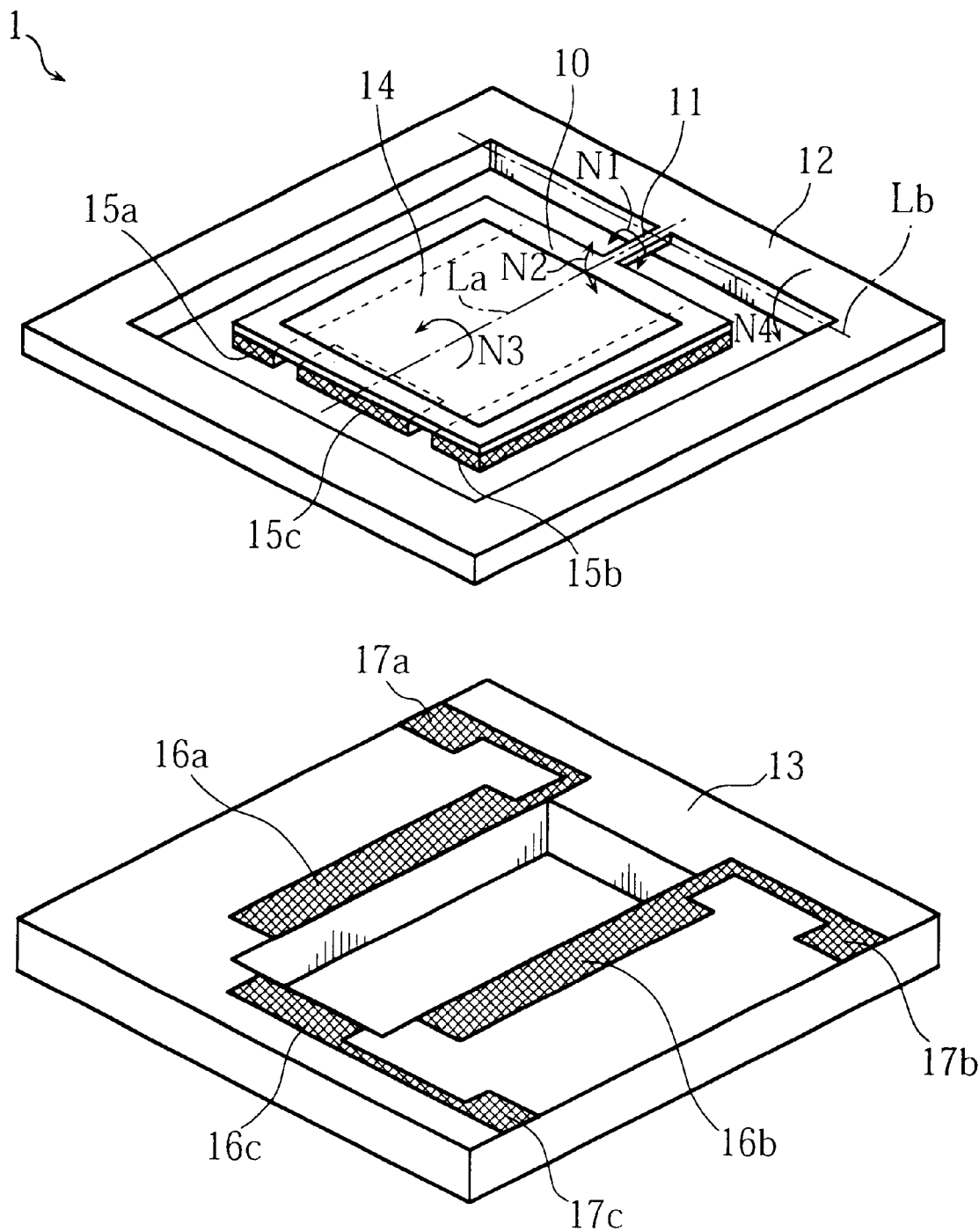
FIG. 2 is an exploded view showing the galvano-mirror of FIG. 1.

Reference is first made to FIGS. 1 and 2 showing a galvano-mirror advantageously used for an optical disk apparatus embodying the present invention. As best shown in FIG. 2, the galvano-mirror 1 includes a mirror plate 10, a connection bar 11, a supporting frame 12 and an auxiliary member 13.

The mirror plate 10 has a rectangular configuration having obverse (upper) and reverse (lower) surfaces. A light reflector 14 is provided on the obverse surface of the mirror plate 10. The reflector 14 maybe realized by forming a metal layer of high reflectance. The mirror plate 10 is connected to the supporting frame 12 by the single connection bar 11. Thus, the mirror plate 10 is supported by the frame 12 in a cantilever manner. As shown in FIG. 2, the connection bar 11 is torsionally deformable in a direction shown by an arrow N1, while also longitudinally deformable in a direction shown by an arrow N2. The supporting frame 12 is formed with a large, rectangular opening in which the mirror plate 10 is movably accommodated. The auxiliary member 13 is a rectangular plate the size of which is the same as that of the supporting frame 12. The auxiliary member 13 is formed with a rectangular opening smaller than the opening of the frame 12. In use, the frame 12 is attached to the auxiliary member 13, as shown in FIG. 1.

As seen from FIGS. 1 and 2, the reverse surface of the mirror plate 10 is provided with three electrodes: a first electrode 15a, a second electrode 15b and a third electrode 15c. Similarly, the obverse surface of the auxiliary member 13 is provided with three electrodes: a fourth electrode 16a, a fifth electrode 16b and a sixth electrode 16c. These three electrodes are held in facing relation to the first, the second and the third electrodes 15a, 15b and 15c, respectively. Though not illustrated, each of the six electrodes are coated with an insulating layer.

As shown in FIG. 2, the first electrode 15a and the second electrode 15b extend in parallel to the axis La of the connection bar 11 and are symmetrical with respect to the axis La. The third electrode 15c, which is elongated in a direction perpendicular to the axis La, is arranged between the first and the second electrodes 15a, 15b. The third electrode 15c extends along one of the four edges of the plate 10 which is the farthest from the connection bar 11 than the other three edges are. The electrodes 15a, 15b and 15c are electrically connected to each other and grounded by non-illustrated wiring. On the other hand, the fourth, the fifth and the sixth electrodes 16a, 16b and 16c are insulated from each other. The electrodes 16a–16c are connected to a relevant one of the terminals 17a–17c formed on the auxiliary member 13.

The function of the galvano-mirror 1 will now be described below.

As previously stated, the connection bar 11 is torsionally deformable about its axis La. Thus, the mirror plate 10, supported by the bar 11, can be rotated about the axis La. For example, to rotate the plate 10 in a direction shown by an arrow N3 in FIGS. 1 and 2, a positive (or negative) voltage is applied to the fourth electrode 16a via the terminal 17a. By this, the first electrode 15a on the mirror plate 10 is negatively (or positively) charged since the electrode 15a is grounded. The appearance of the opposite charges causes the first and the fourth electrodes 15a, 16a to be attracted to each other, thereby causing the mirror plate 10 to rotate in the direction N3. As readily understood, to rotate the plate 10 in the opposite direction, a positive or negative voltage is applied to the fifth electrode 16b via the terminal 17b on the auxiliary member 13. What angle the mirror plate 10 is to be rotated is determined by the balance between the restoring force of the bar 11 and the rotational force exerted by the electrical attraction. The electrical attraction becomes greater as the applied voltage becomes higher. Thus, the rotation angle of the plate 10 can be adjusted by controlling the voltage to be applied.

When voltage is applied to the sixth electrode 16c via the terminal 17c on the auxiliary member 13, the third electrode 15c and the sixth electrode 16c are attracted to each other. Thus, as shown by an arrow N4 in FIG. 2, the mirror plate 10 is rotated downward about a horizontal axis Lb. The axis Lb, as illustrated, extends through or passes closely by the bar 11 and is perpendicular to the above-mentioned axis La. The amount of the rotation about the second axis Lb is also controllable by varying the voltage applied to the sixth electrode 16c.

Figure 3:
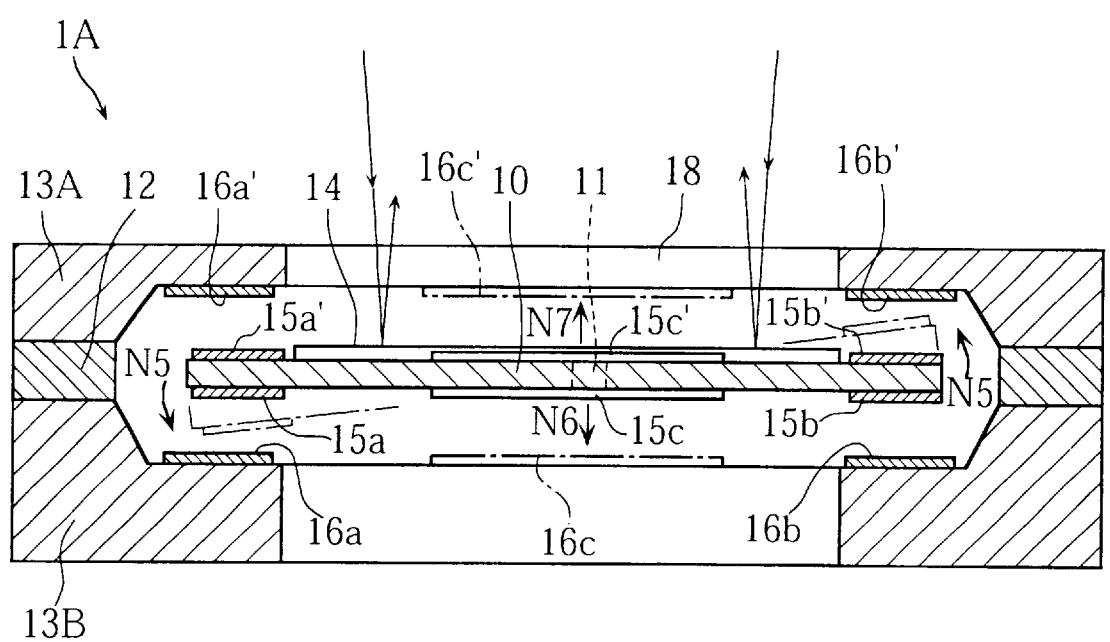
FIG. 3 is a sectional view showing a different type of galvano-mirror.

Referring now to FIG. 3, a different type of galvano-mirror 1A is shown. In the figure, members or elements which are identical or similar to those of the above-described galvano-mirror 1 are designated by the same reference numerals or characters.

The galvano-mirror 1A includes a mirror plate 10 connected to a supporting frame 12 via a connection bar 11. The structural or functional relationship between the plate 10, the bar 11 and the frame 12 of the mirror 1A is the same as that of the galvano-mirror 1. The difference is that the galvano-mirror 1A includes two auxiliary members 13A, 13B. The upper or first auxiliary member 13A is attached to the upper portion of the frame 12, while the lower or second auxiliary member 13B is attached to the lower portion of the frame 12.

The mirror plate 12 has an upper surface upon which a light reflector 14 is provided, and a lower surface upon which three electrodes 15a, 15b and 15c are arranged in the same manner as in the galvano-mirror 1. The upper surface of the mirror plate 12 is provided with another set of three electrodes 15a', 15b' and 15c' which correspond in position to the electrodes 15a, 15b and 15c, respectively. As in the first set of electrodes 15a–15c, the second set of electrodes 15a'–15c' are grounded in common.

The first auxiliary member 13A is formed with an opening 18 to allow external light to strike upon the light reflector 14. As shown in FIG. 3, the first auxiliary member 13A is provided with three electrodes 16a', 16b' and 16c' which are held in facing relation to the three electrodes 15a', 15b' and 15c', respectively. The electrodes 16a', 16b' and 16c' of the first auxiliary member 13A are electrically insulated from each other. A positive or negative voltage can be applied to each of the electrodes 16a', 16b' and 16c' independently of the other two electrodes. The second auxiliary member 13B, basically similar in arrangement to the auxiliary member 13 of the galvano-mirror 1, is provided with three electrodes 16a, 16b and 16c held in facing relation to the electrodes 15a, 15b and 15c, respectively.

To rotate the mirror plate 10 of the galvano-mirror 1A in a direction shown by an arrow N5 (counterclockwise in FIG. 3), voltage is applied to both the electrode 16a and the electrode 16b'. By this, an electrical attracting force is generated not only between the electrode 15a and the electrode 16a, but also between the electrode 15b' and the electrode 16b'. Thus, the mirror plate 10 is rotated in the N5-direction by two oppositely-directed attracting forces. To rotate the plate 10 in the opposite direction (clockwise in FIG. 3), voltage is applied to the electrode 16a' and to the electrode 16b.

In the galvano-mirror 1A, rotational force is exerted on two opposite ends of the mirror plate 10, while in the galvano-mirror 1, rotational force is exerted only on one end of the mirror plate. Thus, in the galvano-mirror 1A, a smaller rotational force suffices to rotate the mirror plate 10 through the same rotation angle. This means that to operate the galvano-mirror 1A needs lower driving voltage or smaller electrodes, as compared to the galvano-mirror 1.

In the galvano-mirror 1A, when voltage is applied to the electrode 16c, the mirror plate 10 is rotated in a downward direction shown by an arrow N6 (which corresponds to the arrow N4 in FIG. 2). On the other hand, when voltage is applied to the electrode 16c', the mirror plate 10 is rotated in an upward direction shown by an arrow N7. It should be noted that such upward movement of the mirror plate 10 cannot be achieved in the galvano-mirror 1.

In the above-described two galvano-mirrors 1 and 1A, electrical force is used for rotating the mirror plate 10, though the present invention is not limited to this. For example, electromagnetic force or mechanical force (utilizing e.g. a piezoelectric element) may be used for serving the same purpose.

Reference is now made to FIGS. 4–8 illustrating an optical disk apparatus according to a first embodiment of the present invention.

Figure 4:
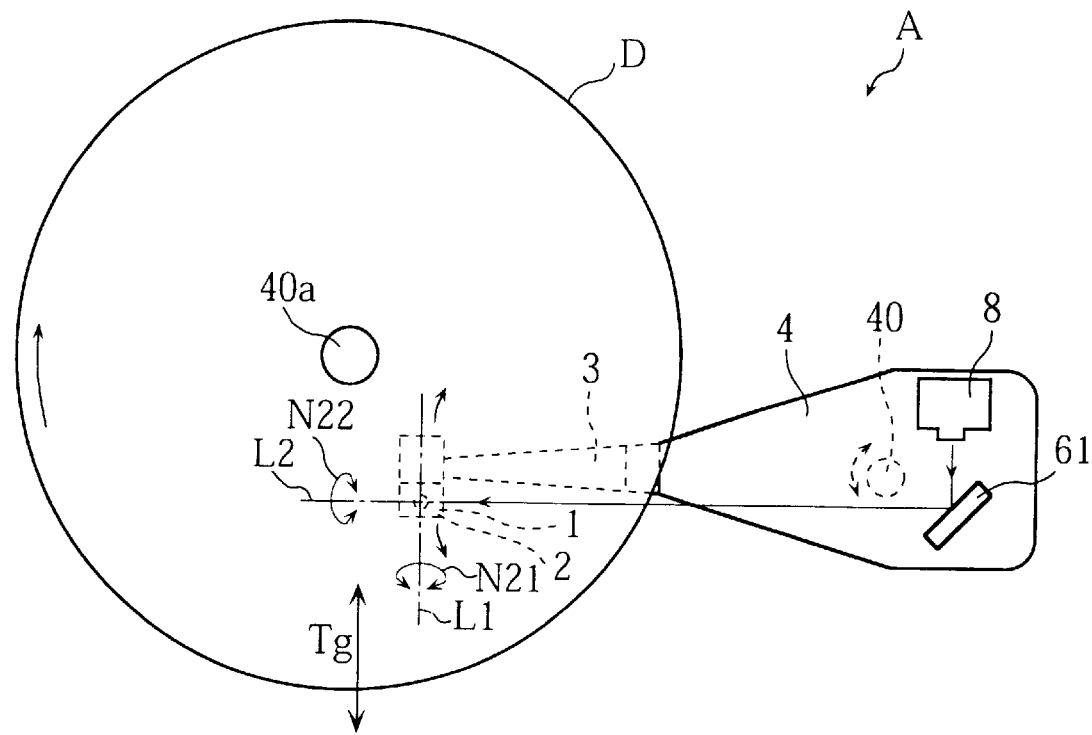
FIG. 4 is a schematic plan view showing an optical disk apparatus according to a first embodiment of the present invention.
Figure 5:
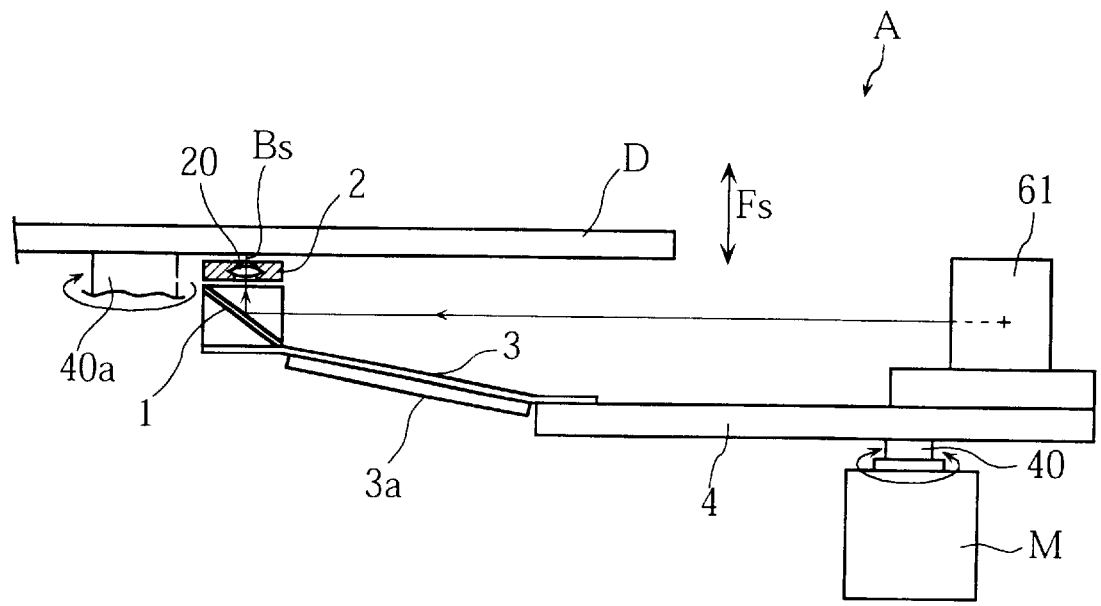
FIG. 5 is a side view showing the optical disk apparatus of FIG. 4.

As best shown in FIGS. 4 and 5, the optical disk apparatus A of the present invention includes a spindle 40a upon which an optical disk D is supported horizontally. Though not illustrated, the spindle 40a is connected to a spindle motor. Thus, upon turning on the spindle motor, the disk D will be rotated at predetermined speed. The apparatus A also includes a galvano-mirror 1 and a slider 2 both of which are mounted on the front end of a suspension 3. The suspension 3 is attached to the front end of a swing arm 4.

The galvano-mirror 1 may be the one shown in FIGS. 1 and 2 or the one shown in FIG. 3. The suspension 3 is an elongated plate which is flexible in the focusing direction Fs (see FIG. 5). While being appropriately flexible, the suspension 3 needs to be stiff enough to support the galvano-mirror 1 and the slider 2. To this end, the suspension 3 is provided with two longitudinal reinforcing hems 3a (see also FIG. 8).

The swing arm 4 has a rear end which is broader than its front end. This rear end is connected to a driving shaft 40 which in turn is connected to a reversible motor M. Thus, upon turning on the motor M, the swing arm 4 is caused to rotate or pivot about the axis of the shaft 40. By this pivotal movement of the swing arm 4, the galvano-mirror 1 and the slider 2 are moved in the tracking direction Tg (FIG. 4) under the disk D (see FIG. 5).

The optical disk apparatus A further includes a light emitting/detecting unit 8 and a mirror 61 both of which are mounted on the rear end of the swing arm 4. The mirror 61 is stationary in relation to the unit 8. Though not illustrated, the unit 8 is provided with a light source and a detector. The light source may consist of a laser diode and a lens to collimate the laser beam emitted from the laser diode. After being emitted from the light source, the laser beam is reflected on the mirror 61, to be directed toward the galvano-mirror 1. Then, as shown in FIG. 5, the laser beam is directed upward and forms a beam spot on the recording layer of the disk D. The recording layer reflects the laser beam. Thereafter, the laser beam retraces the path along which the beam has traveled from the unit 8 to the disk D. The returned laser beam enters the unit 8 and is received by the non-illustrated detector. Based on the received light, various data processing operations including the detection of recorded data are performed.

Figure 6:
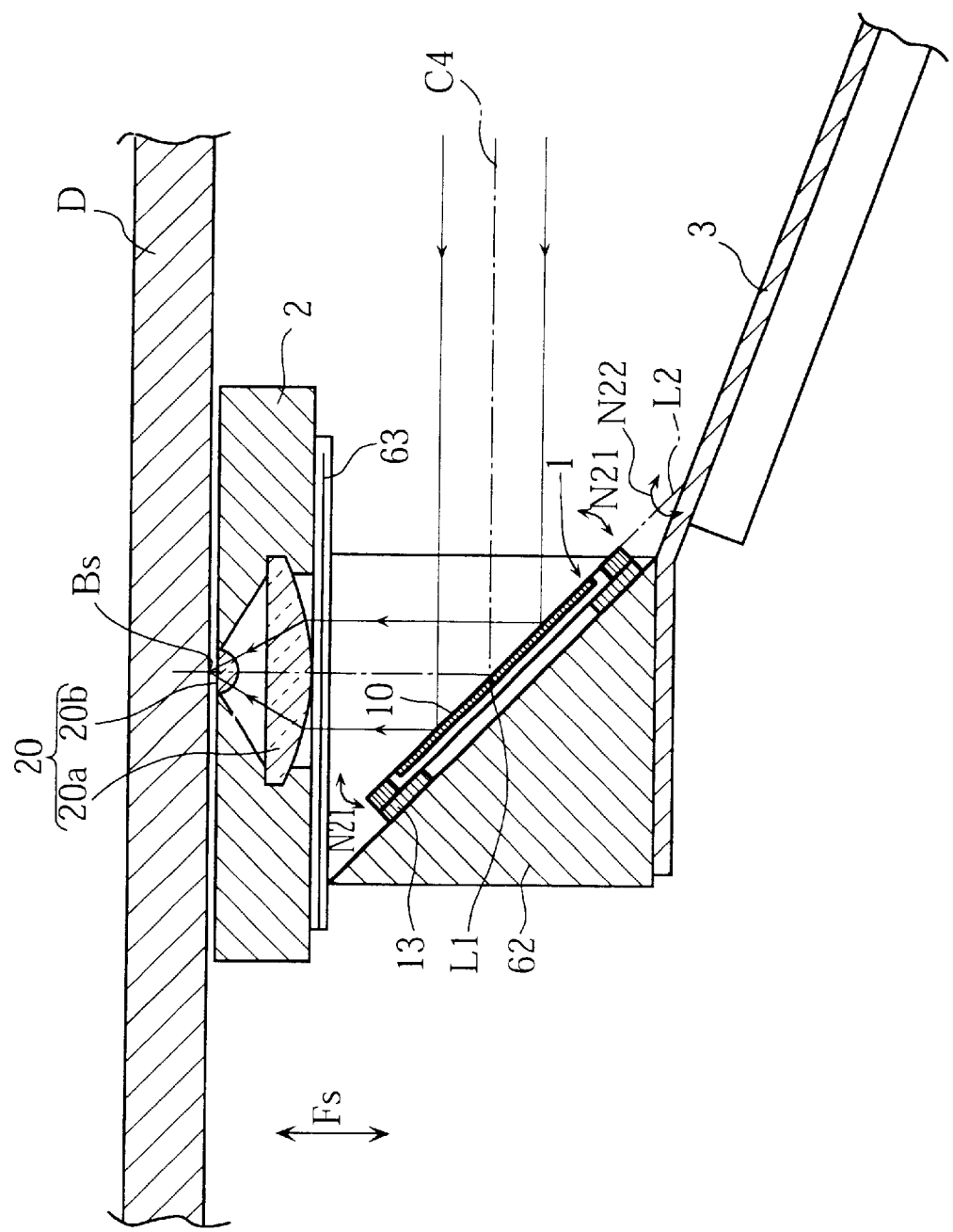
FIG. 6 is an enlarged sectional view showing a principal portion of the apparatus of FIG. 5.

Referring now to FIG. 6, the slider 2 carries an objective lens unit 20 consisting of a first (lower) lens 20a and a second (upper) lens 20b. The second lens 20b, which is arranged closer to the disk D than the first lens 20a, may be a solid immersion lens suitable for increasing the numerical aperture (NA) of the lens unit 20. According to the present invention, the number of lenses used for the lens unit 20 is not limited to two. Only one lens or more than two lenses may be used for the lens unit 20.

Upon rotating the disk D at high speed, the slider 2 is caused to "float" above the disk D. More specifically, when the disk D is rotated, the slider 2 is moved downward from the disk D by a predetermined distance due to the slider-floating action of the air drawn between the slider 2 and the disk D. In the illustrated embodiment, the slider 2 is arranged below the disk D, though the present invention is not limited to this. As in the conventional disk apparatus, the slider 2 may be located above the disk D. In this case, the slider 2 is moved upward from the disk D when the disk D is rotated at high speed. It should be appreciated that, in this specification, the word "float" is used to describe not only a situation where a slider disposed above a disk is moved upward from the disk, but also a situation where a slider disposed below a disk is moved downward from the disk.

Referring to FIG. 6, the galvano-mirror 1 is supported by the suspension 3 via a holder 62. The galvano-mirror 1 is disposed immediately below the slider 2, and appropriately inclined so that the laser beam coming from the above-mentioned mirror 61 (see FIG. 4 or 5) is reflected toward the lens unit 20.

Figure 8:
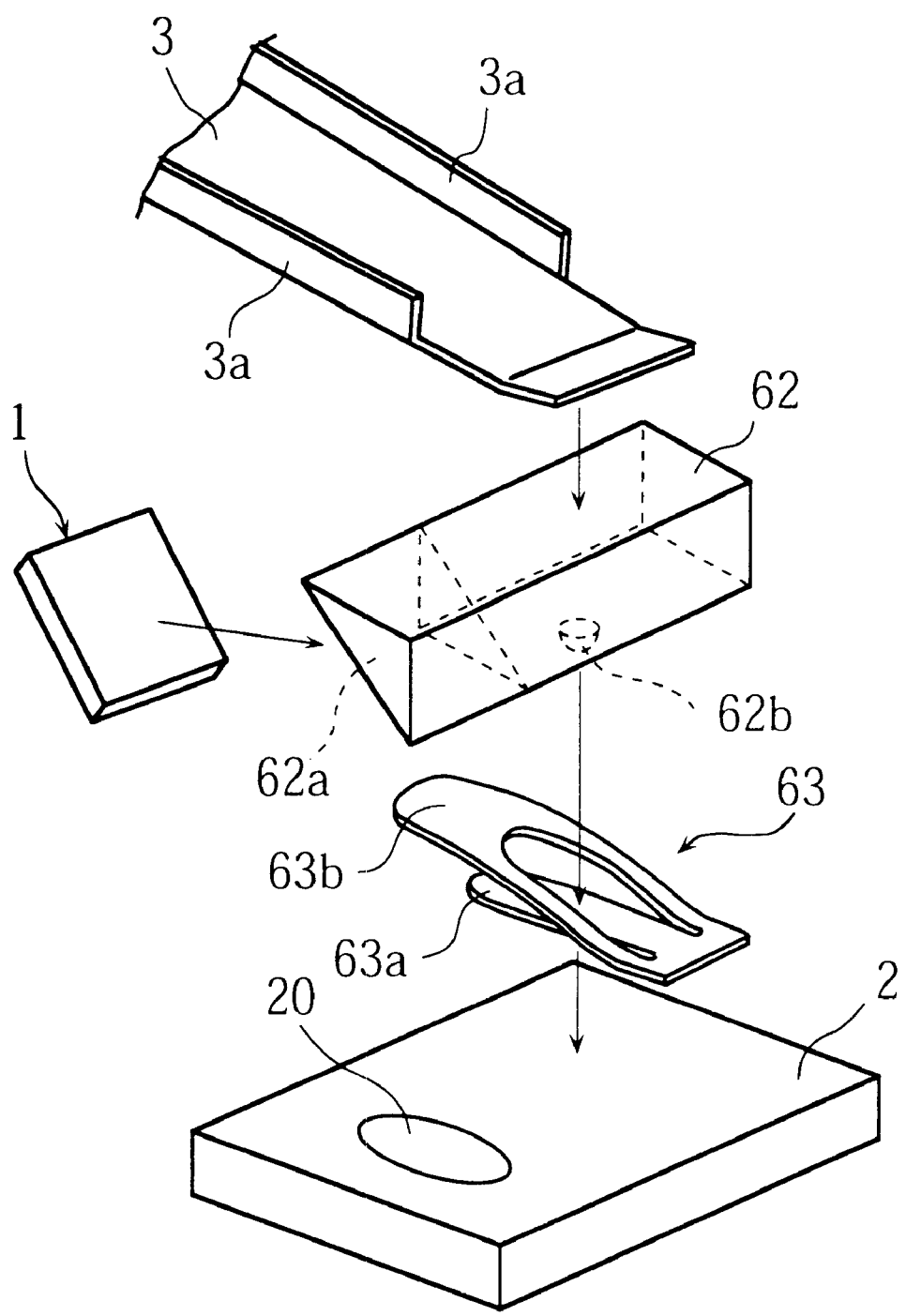
FIG. 8 is an exploded view showing a slider-supporting structure according to the present invention.

Referring to FIG. 8 (in which the vertical direction is turned upside down), the slider 2 is attached to the holder 62 via a gimbal spring 63. The illustrated spring 63 is provided with a central strip 63a and an outer portion 63b. The central strip 63a is attached to the slider 2, while the outer portion 63b is attached to the holder 62.

The holder 62 is divided into two parts: a rectangular parallelepiped portion and a triangular prism portion having a slant surface 62a. The rectangular parallelepiped portion is attached to the front end of the suspension 3. The galvano-mirror 1 is attached to the slant surface 62a of the triangular prism portion. The rectangular parallelepiped portion of the holder 62 is formed with a pivot projection 62b brought into contact with the central strip 63a of the gimbal spring 63. With such an arrangement, the slider 2 can pivot on the projection 62b in any direction.

As shown in FIGS. 4 and 6, the galvano-mirror 1 is rotatable in a direction shown by an arrow N21 about a horizontal axis L1, while also being rotatable in a direction shown by an arrow N22 about a slant axis L2 which is perpendicular to the horizontal axis L1. The axis L1 extends perpendicularly to the path of the laser beam traveling from the mirror 61 to the galvano-mirror 1.

Figure 9A:
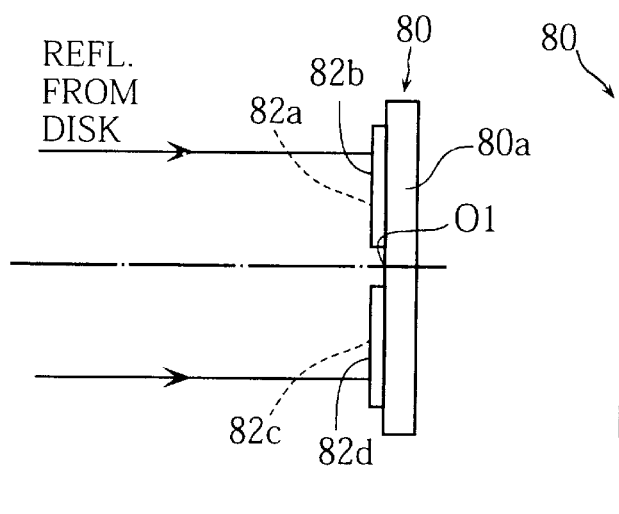
FIGS. 9A and 9B show a photoelectric device used for the disk apparatus of the first embodiment.
Figure 9B:
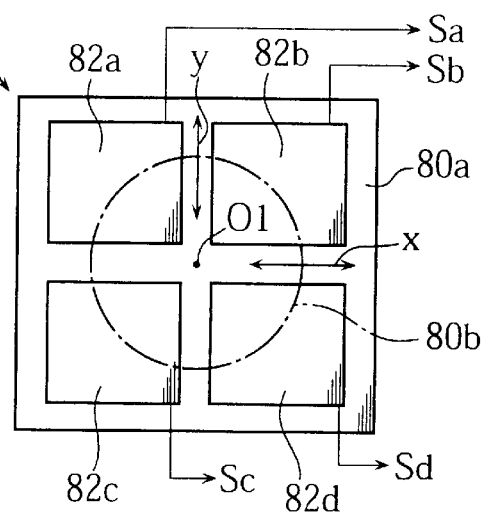
Figure 10:
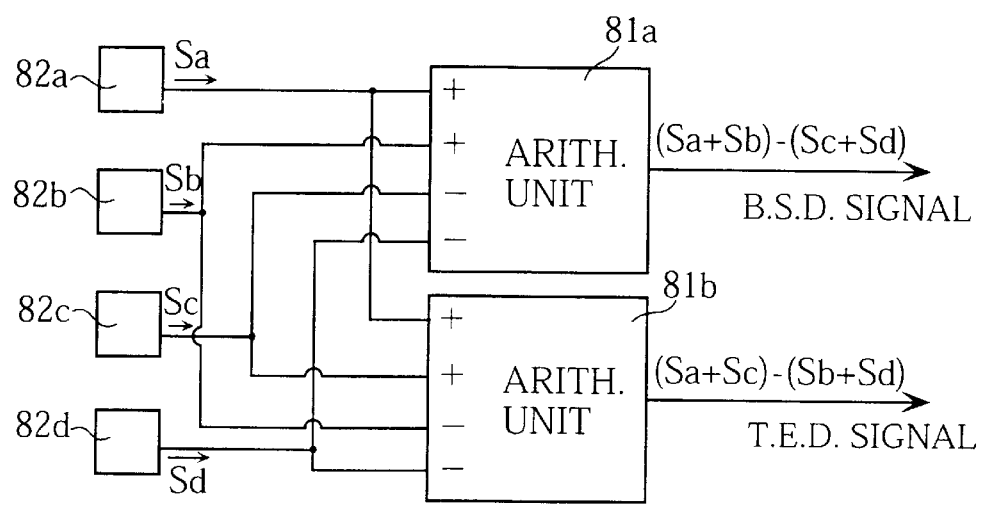
FIG. 10 is a block diagram showing a signal generating circuit used for the disk apparatus of the first embodiment.

Referring to FIGS. 9 and 10, the detector of the light emitting/detecting unit 8 is provided with a photoelectric device 80 (FIGS. 9A, 9B) and a pair of arithmetical units 81a, 81b (FIG. 10). As described below, these devices are provided for generating tracking error detection signals and beam shift detection signals.

As shown in FIGS. 9A and 9B, the photoelectric device 80 includes a rectangular substrate 80a having an obverse surface and a reverse surface. The obverse surface is provided with four rectangular light-receiving elements 82a–82d to detect the laser beam returned from the disk D. As best shown in FIG. 9B, the four elements 82a–82d are symmetrically arranged around the central reference point O1 of the substrate 80a. Each of the light-receiving elements 82a–82d is designed to output a detection signal (see Sa–Sd in FIG. 9B) corresponding to the amount of the received light. Normally (i.e., when there are no tracking error and no beam shift), the returned laser beam will strike the circular region 80b shown in FIG. 9B. However, when a tracking error occurs, the returned laser beam deviates from the reference point O1 in the X-direction. On the other hand, when a beam shift occurs (see FIG. 6), the returned laser beam deviates in the Y-direction.

Referring to FIG. 10, the detection signals Sa–Sd from the light-receiving elements Sa–Sd are supplied to the first and the second arithmetical units 81a, 81b. The first arithmetical unit 81a generates a beam shift detection signal based on the value of [(Sa+Sb)−(Sc+Sd)]. As stated above, the returned laser beam will deviate from the reference point O1 in the Y-direction at the time of beam shift. As a result, the amount of the light received by the first and the second light-receiving elements 82a, 82b becomes unequal to the amount of the light received by the third and the fourth light-receiving elements 82c, 82d. Hence, by calculating the value [(Sa+Sb)−(Sc+Sd)], the direction (up or down) and the extent of the beam shift is determined.

The second arithmetical unit 81b generates a tracking error detection signal based on the value of [(Sa+Sc)−(Sb+Sd)]. When tracking action is not proper, the returned laser beam will deviate from the reference point O1 in the X-direction. In this case, the amount of the light received by the first and the third light-receiving elements 82a, 82c is different from the amount of the light received by the second and the fourth light-receiving elements 82b, 82d. Therefore, by calculating the value [(Sa+Sc)−(Sb+Sd)], the direction and the extent of the tracking error can be determined.

Figure 11:
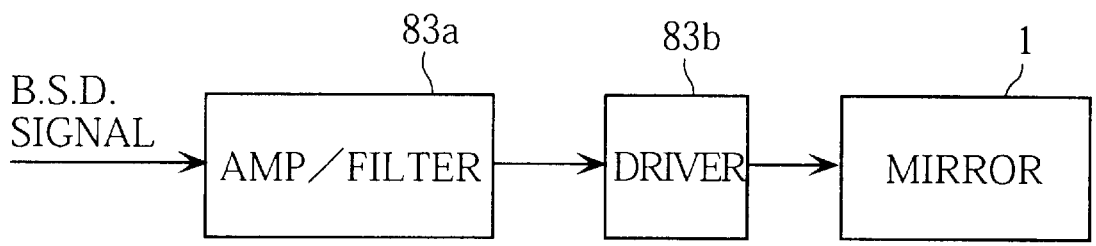
FIG. 11 is a block diagram showing a control system of the disk apparatus of the first embodiment.

Referring to FIG. 11, the obtained beam shift detection signal is amplified and then filtered by an amplifying/filtering device 83a. Thereafter, the detection signal is supplied to a driver 83b. Based on the supplied beam shift detection signal, the driver 83b adjusts the inclination angle of the galvano-mirror 1. Similarly, based on the tracking error detection signal, the driver 83b performs required tracking control.

The function of the optical disk A will now be described.

Referring back to FIGS. 4 and 5, the laser beam emitted from the unit 8 is reflected on the stationary mirror 61 and the galvano-mirror 1, to be led into the lens unit 20. Then, as shown in FIG. 6, the laser beam forms a beam spot Bs on the recording layer of the disk D. In this state, data may be written in the disk D by magnetic field modulation or optical pulse modulation. The laser beam striking upon the recording layer is reflected and returned to the unit 8. By analyzing this returned light, as stated above, a tracking error detection signal and a beam shift detection signal are obtained. The returned light is utilized also for reading out the data stored in the disk D.

Figure 7:
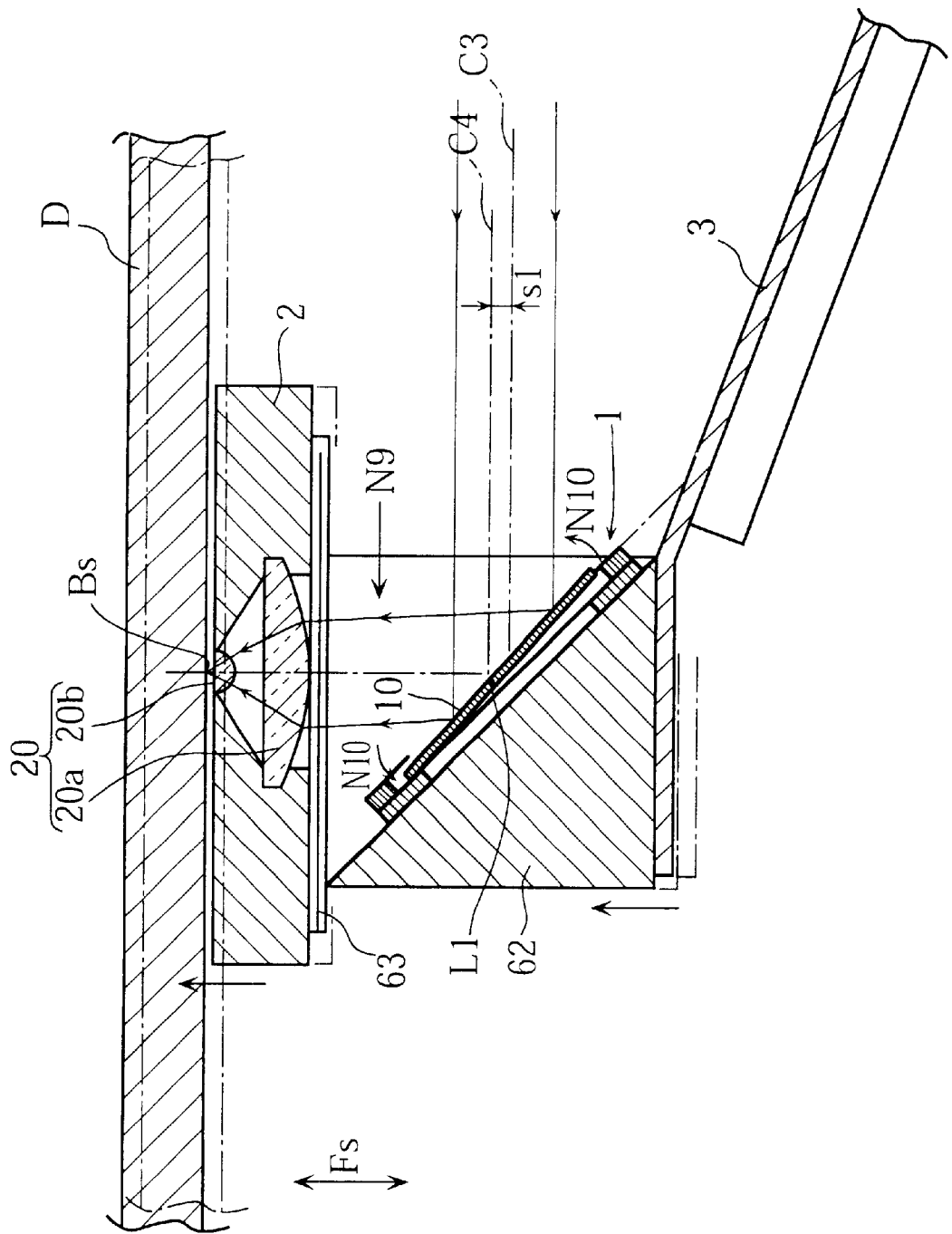
FIG. 7 illustrates the function of the galvano-mirror shown in FIG. 6.

Referring to FIG. 7, it is now assumed that the disk D fluctuates during a data-recording or data-reading operation, and moves upward from the original position (shown in phantom) to the current position (shown by solid lines). Following this movement, the slider 2 and the galvano-mirror 1 are also moved upward, while the height of the laser beam traveling toward the galvano-mirror 1 remains the same. Thus, the vertical position of the center of the laser beam relative to the galvano-mirror 1 is moved by a distance s1 equal to the upward displacement of the galvano-mirror 1. In FIG. 7, the original center line of the laser beam is shown by C4, while the center line of the deviating laser beam is shown by C3. In such an instance, according to the present invention, the mirror plate 10 of the galvano-mirror 1 is rotated in an N10-direction (counterclockwise in FIG. 7) about the horizontal axis L1 under the control of the above-mentioned driver 83b (FIG. 11). Accordingly, the laser beam reflected by the mirror plate 10 is directed in an N9-direction (to the left in FIG. 7), so that the beam properly enters the lens unit 20. Such beam shift correction is performed based on the beam shift detection signal supplied from the first arithmetical unit 81a (FIG. 10).

When the disk D is moved downward, as opposed to the case shown in FIG. 7, the driver 83b rotates the mirror plate 10 in the opposite direction (clockwise in FIG. 7). As a result, the reflected light is properly directed to the center of the lens unit 20.

According to the present invention, the mirror plate 10 is small in weight. Thus, the mirror plate 10 can be rotated about the axis L1 swiftly, which is advantageous to performing the required beam shift correction in time.

To perform tracking control, the mirror plate 10 of the galvano-mirror 1 is rotated about the second axis L2 (see FIGS. 4 and 6), thereby swaying the beam spot Bs of the laser beam in the tracking direction Tg (FIG. 4). This tracking control is performed based on the tracking error detection signal supplied from the second arithmetical unit 81b.

With the use of the controllable galvano-mirror 1 and the swing arm 4, the tracking control in the apparatus A is performed in twofold manners: coarse tracking control achieved by the swing arm 4 and fine tracking control achieved by the galvano-mirror 1. In the coarse tracking control (or seek operation), the swing arm 4 is caused to pivot about the driving shaft 40 (FIG. 4) to bring the slider 2 to a required position which is above a selected one of the tracks of the disk D. Once the slider 2 (hence the lens unit 20) has been properly positioned, the mirror plate 10 of the galvano-mirror 1 is rotated about the second axis L2 for providing the fine tracking control.

In the optical disk apparatus A, as previously described in reference to FIG. 8, the slider 2 is supported on the projection 62b of the holder 62 in a manner allowing the slider 2 to pivot in any direction. Thus, the slider 2 can adjust its posture relative to the disk D, thereby maintaining proper facing relation to the disk D. It should be noted here that the weight of the galvano-mirror 1 and the holder 62 bears on the suspension 3 but not on the slider 2. Thus, the slider 2 can perform timely posture adjustment relative to the disk D. Preferably, the center of gravity of the slider 2 is supported by the projection 62b of the holder 62, whereby the posture adjustment of the slider 2 is performed properly.

To stabilize the galvano-mirror 1 and the slider 2 relative to the disk D, the holder 62 needs to be stably supported by the suspension 3. To this end, preferably, the elongated holder 62 is supported at its longitudinal center of gravity by the suspension 3.

Figure 12:
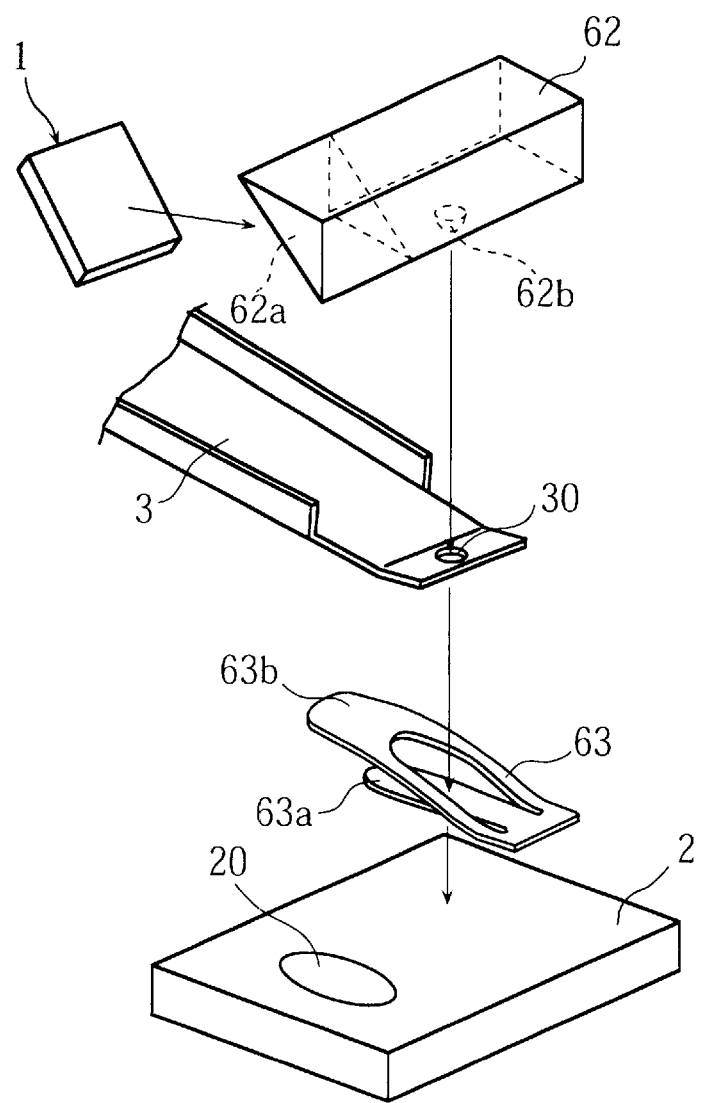
FIG. 12 is an exploded view showing the slider-supporting structure of an optical disk apparatus according to a second embodiment of the present invention.

Reference is now made to FIG. 12 illustrating some principal components of an optical disk apparatus according to a second embodiment of the present invention. The illustrated slider-connecting structure is similar to that shown in FIG. 8, except that the slider 2 is fixed to the suspension 3 via the gimbal spring 63 but not via the holder 62. In the illustrated embodiment, the pivot projection 62a of the holder 62 is fitted into the front end hole 30 of the suspension 3 and caused to protrude therefrom. The thus fixed projection 62b is brought into contact with the central strip 63a of the gimbal spring 63 that is attached to the slider 2. The outer portion 63b is directly attached to the suspension 3 but not the holder 62. Advantageously, with such an arrangement, the weight of the galvano-mirror 1 and the holder 62 does not bear on the slider 2.

FIGS. 13–16 show an optical disk apparatus Aa according to a third embodiment of the present invention. In this embodiment, as seen from FIGS. 13 and 14, use is made of two galvano-mirrors 5A and 5B each of which is designed to rotate about a single axis only. The first single-axis mirror 5A is supported by the front end of the suspension 3, while the second single-axis mirror SB is mounted on the rear end of the swing arm 4.

The first and the second galvano-mirrors 5A, 5B may have a structure shown in FIG. 16. In the illustrated galvano-mirror, the mirror plate 10 is attached to the frame 12 via two linearly-aligned connection bars 11a and 11b. The mirror plate 10 is provided, at its reverse surface, with two electrodes 15a and 15b, while the auxiliary member 13 is provided, at its obverse surface, with two electrodes 16a and 16b held in facing relation to the two electrodes 15a and 15b on the mirror plate 10, respectively. The mirror plate 10 is rotated about the axis La by an attracting force generated between the first paired electrodes 15a and 16a or between the second paired electrodes 15b and 16b.

Figure 13:
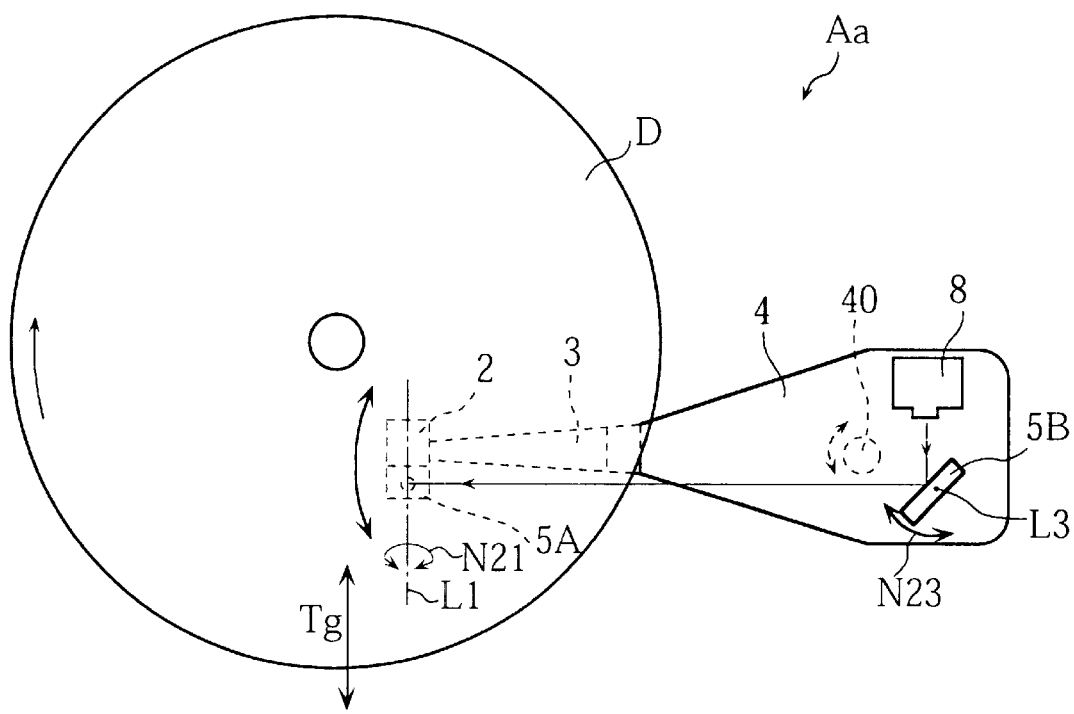
FIG. 13 is a plan view showing an optical disk apparatus according to a third embodiment of the present invention.
Figure 14:
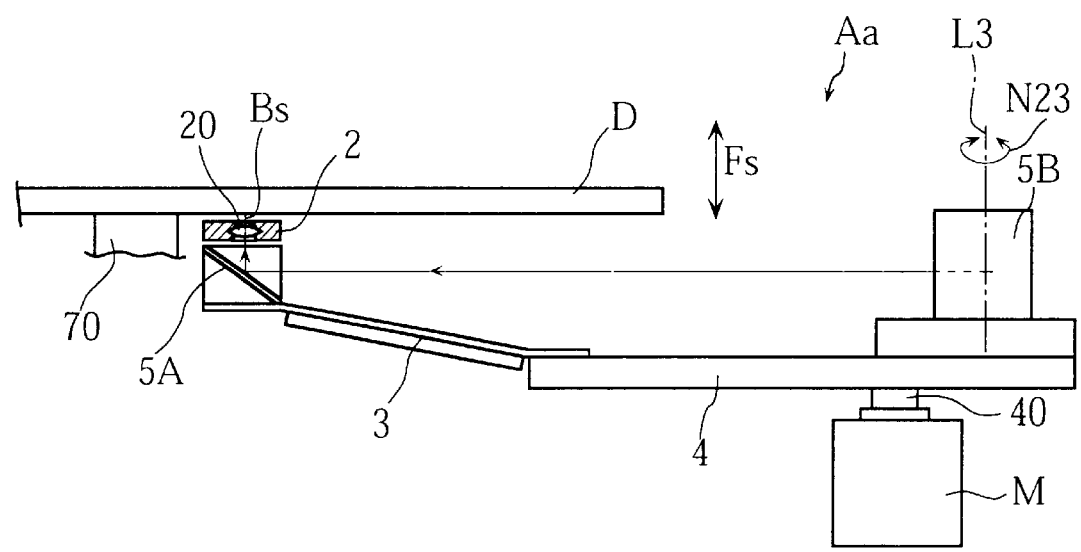
FIG. 14 is a side view showing the apparatus of FIG. 13.
Figure 15:
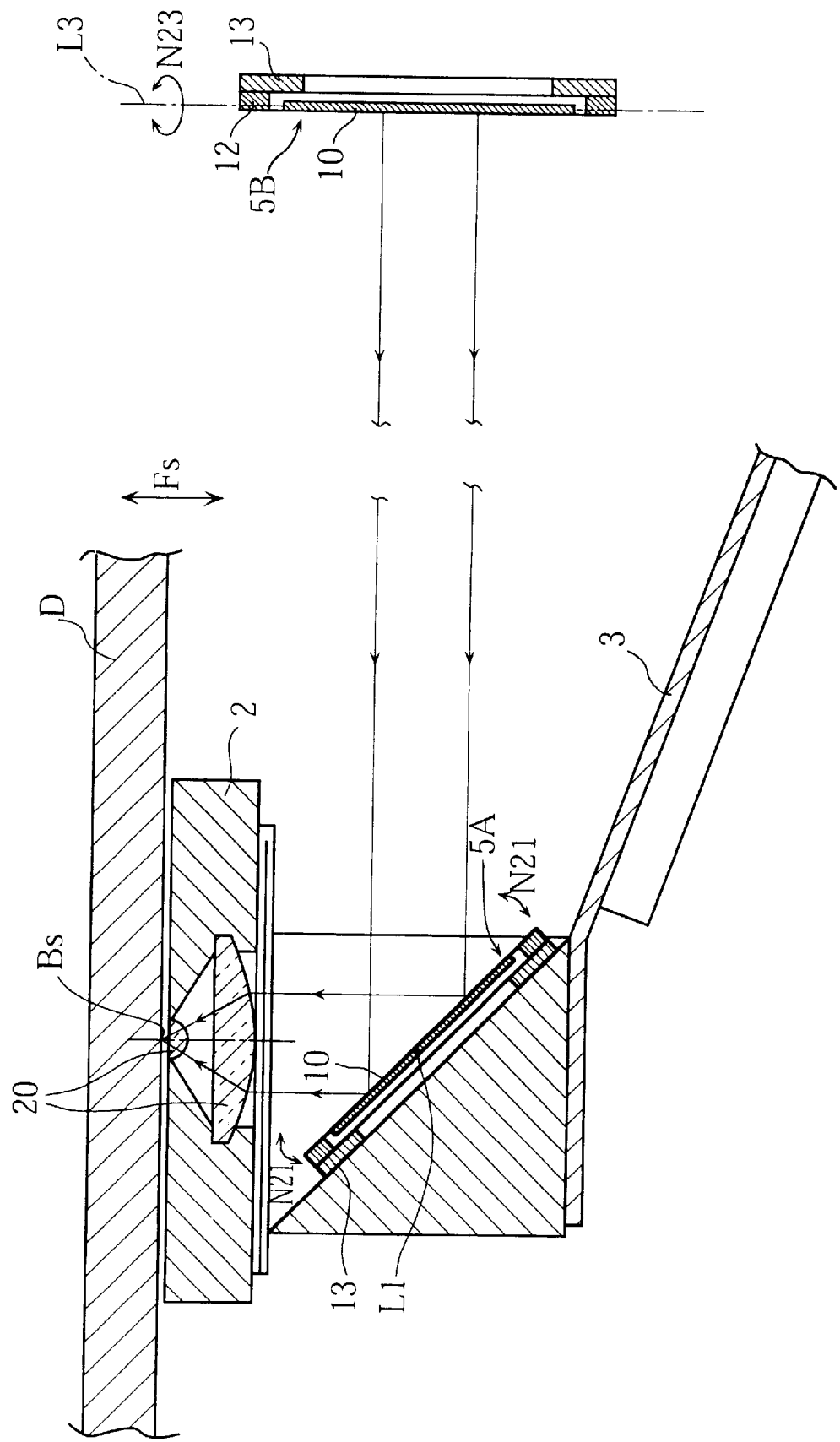
FIG. 15 is an enlarged sectional view showing a principal portion of the apparatus of FIG. 14.

As shown in FIGS. 13–15, the first mirror 5A is rotatable about a horizontal axis L1 (see the arrow N21) extending in the tracking direction Tg, while the second mirror 5B is rotatable about a vertical axis L3 (see the arrow N23) extending in the focusing direction Fs.

In the apparatus Aa, the mirror 5A is rotated about the axis L1 to cope with the height variation of the laser beam caused by the fluctuation of the disk D. By actuating the mirror 5A about the axis L1, the path of the reflected light is moved in a direction perpendicular to the tracking direction Tg, thereby correcting the deviation of the light path from the lens unit 20. When the second mirror 5B is rotated about the axis L3, on the other hand, the path of the laser beam traveling from the second mirror 5B to the first mirror 5A is moved in the tracking direction. Thus, the beam spot Bs formed on the disk D is moved in the tracking direction.

Figure 17:
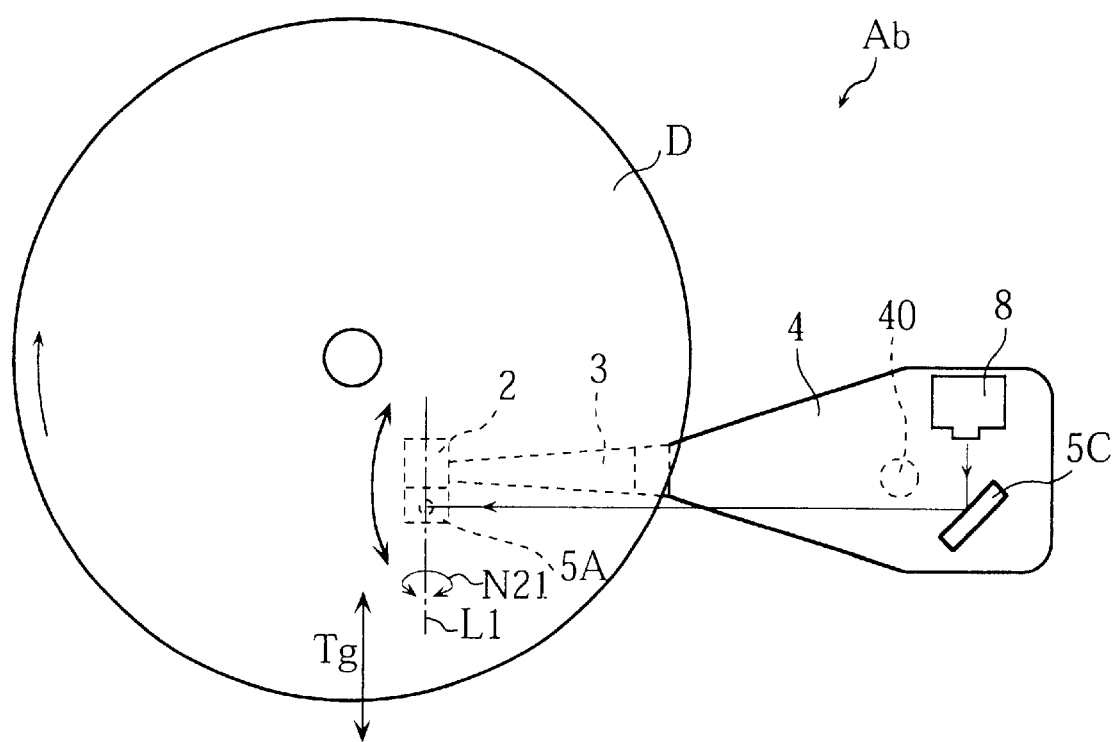
FIG. 17 is a plan view showing an optical disk apparatus according to a fourth embodiment of the present invention.

FIG. 17 shows an optical disk apparatus Ab according to a fourth embodiment of the present invention. In this embodiment, the mirror 5C mounted on the rear end of the swing arm 4 is stationary in relation to the light emitting/detecting unit 8. The other mirror 5A may be the same as the one used for the third embodiment. The tracking control in this embodiment may be performed by causing the swing arm 4 to pivot about the shaft 40. Alternatively, a fine actuator, specifically designed for performing the tracking control, may be mounted on the front end of the suspension 3. According to the fourth embodiment, the stationary mirror 5C may be omitted, and the laser beam from the unit 8 may be directly led to the galvano-mirror 5A.

Figure 18:
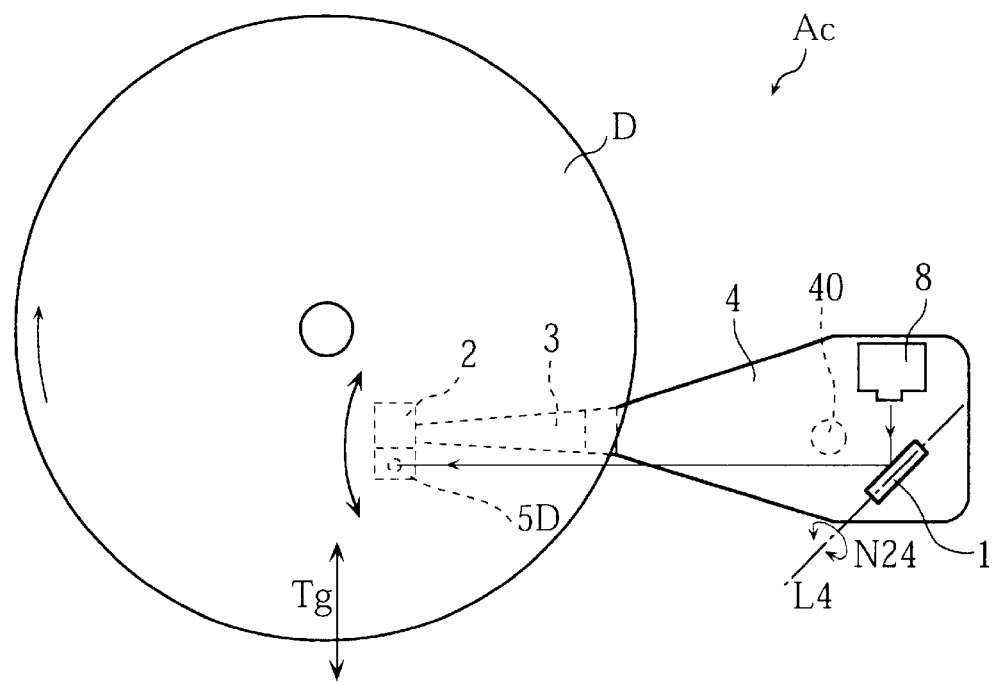
FIG. 18 is a plan view showing an optical disk apparatus according to a fifth embodiment of the present invention.
Figure 19:
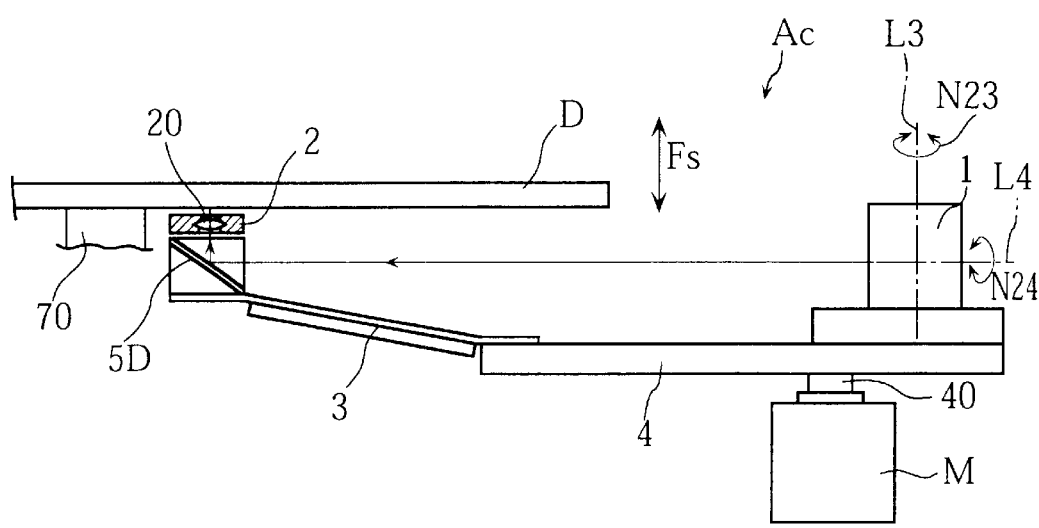
FIG. 19 is a side view showing the apparatus of FIG. 18.
Figure 20:
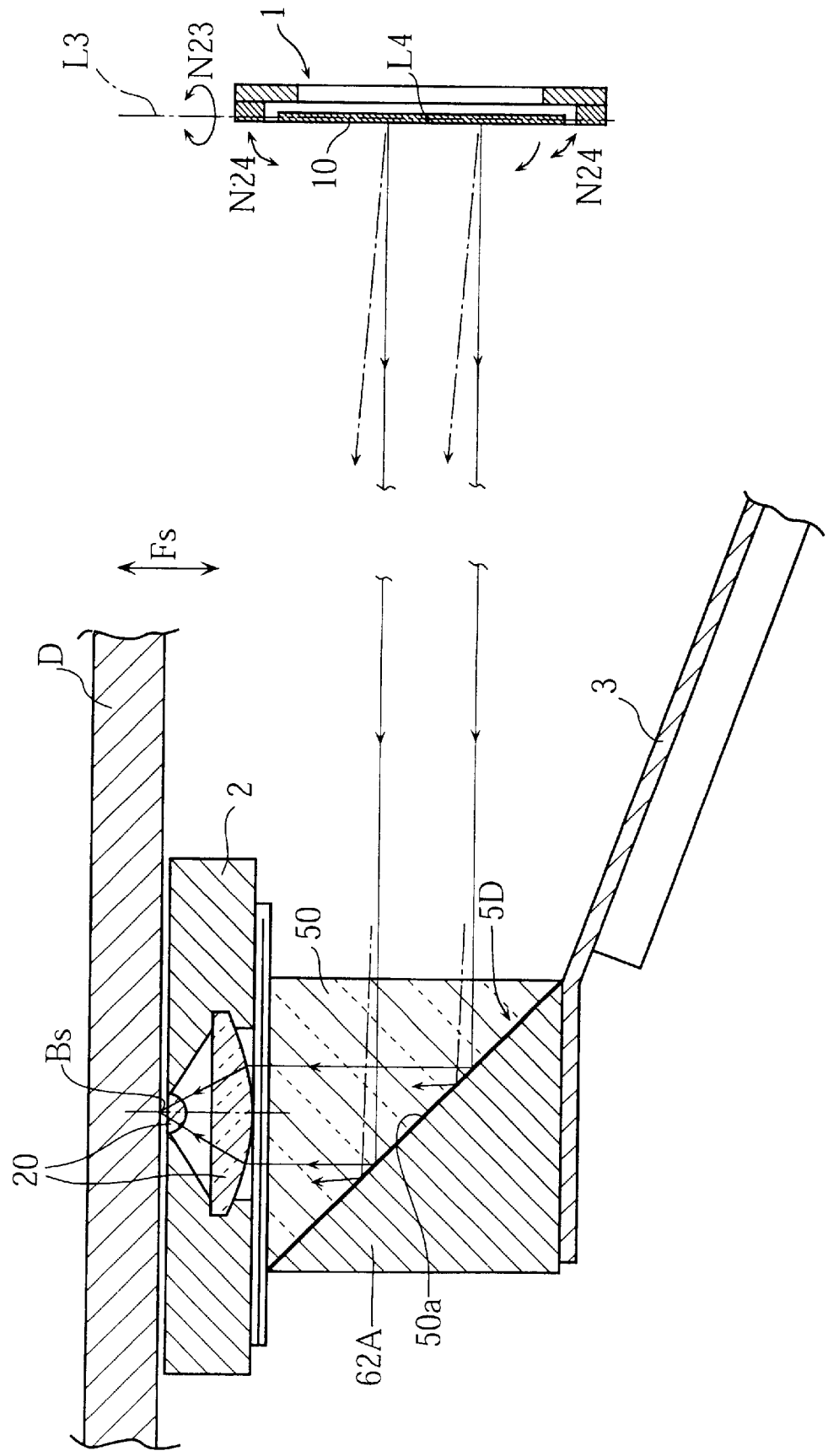
FIG. 20 is an enlarged sectional view showing a principal portion of the apparatus of FIG. 19.

FIGS. 18–20 shows an optical disk apparatus Ac according to a fifth embodiment of the present invention. In this embodiment, the front end of the suspension 3 carries a stationary mirror 5D, while the rear end of the swing arm 4 supports a "double-axis" galvano-mirror 1 as shown in FIGS. 1–2.

Referring to FIG. 20, the stationary mirror 5D is a reflective surface 50a of a triangular prism 50 mounted on a holder 62A. In place of the prism 50, use may be made of a planar mirror including a reflective metal layer.

As shown in FIGS. 18–20, the mirror plate 10 of the galvano-mirror 1 is rotatable about the axis L3 (arrow N23) and about the axis L4 (arrow N24). When the disk D fluctuates in the focusing direction Fs, the mirror plate 10 is rotated about the axis L4. In the exemplary situation shown in FIG. 20, the slider 2 and the mirror 5D are moved upward to follow the fluctuation of the diskD. Accordingly, the mirror plate 10 is rotated clockwise about the axis L4, so that the reflected laser beam travels upward (see the single-dot chain lines). When the mirror plate 10 is rotated about the vertical axis L3, on the other hand, the path of the reflected laser beam is moved in the tracking direction, so that the beam spot Bs formed on the recording layer of the disk D is also moved in the tracking direction.

Figure 21:
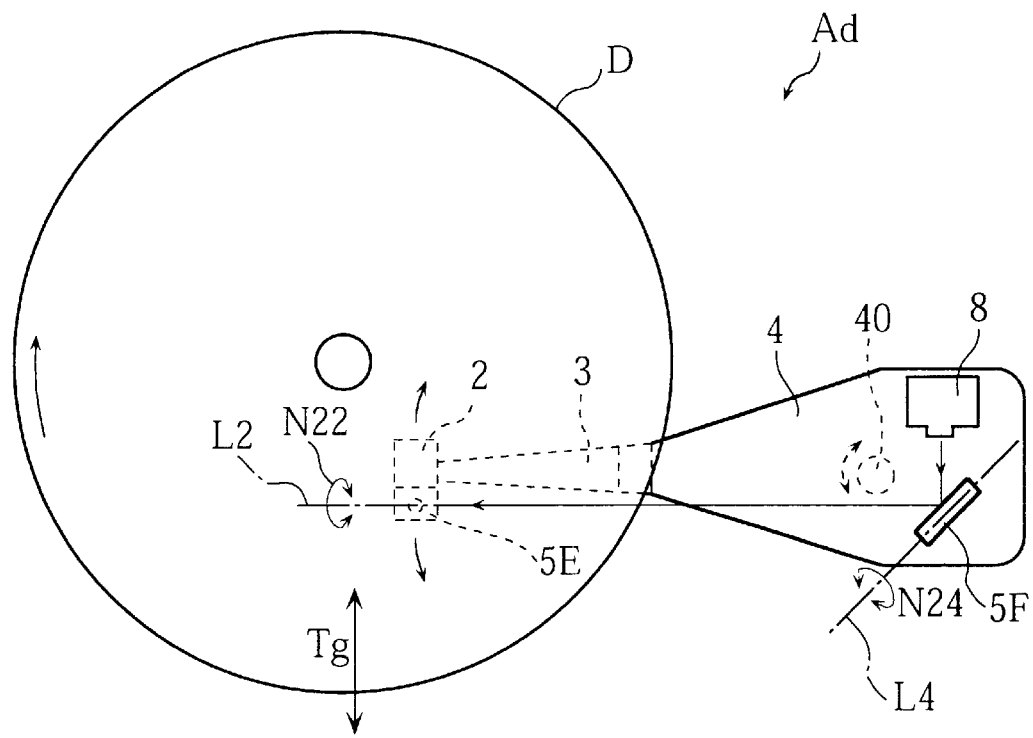
FIG. 21 is a plan view showing an optical disk apparatus according to a sixth embodiment of the present invention.
Figure 22:
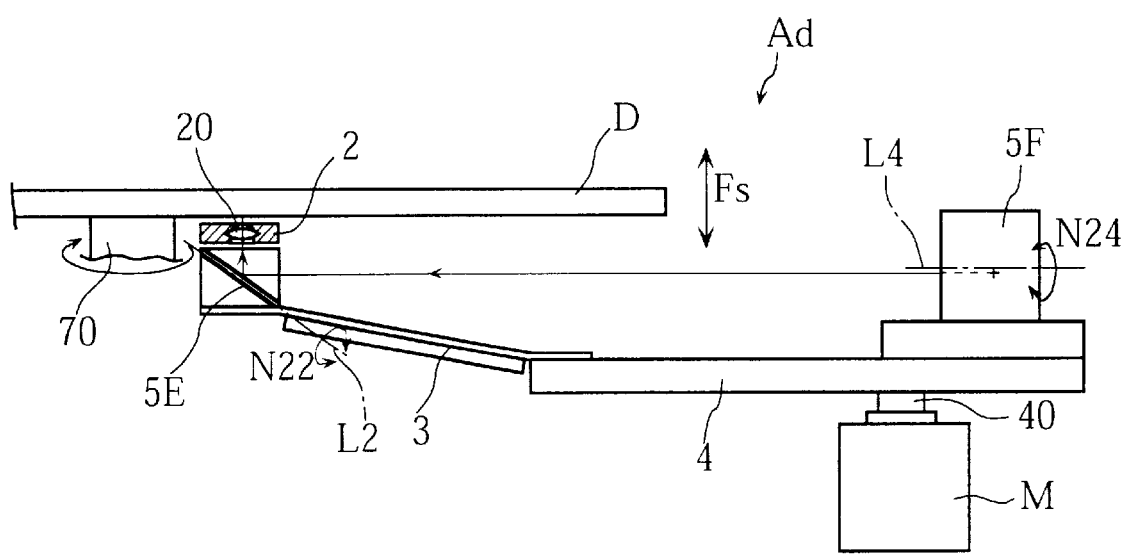
FIG. 22 is a side view showing the apparatus of FIG. 21.

FIGS. 21 and 22 show an optical disk apparatus Ad according to a sixth embodiment of the present invention. The illustrated apparatus Ad includes a mirror 5E supported by the suspension 3 and a mirror 5F mounted on the rear end of the swing arm 4. Each of the first and the second mirrors 5E, 5F is a single-axis galvano-mirror as shown in FIG. 16. The first mirror 5E is rotatable about the axis L2 (see arrow N22) for swaying the reflected laser beam in the tracking direction Tg. The second mirror 5F is rotatable about the axis L4 (see arrow N24) for swaying the reflected light in the focusing direction Fs.

Figure 23:
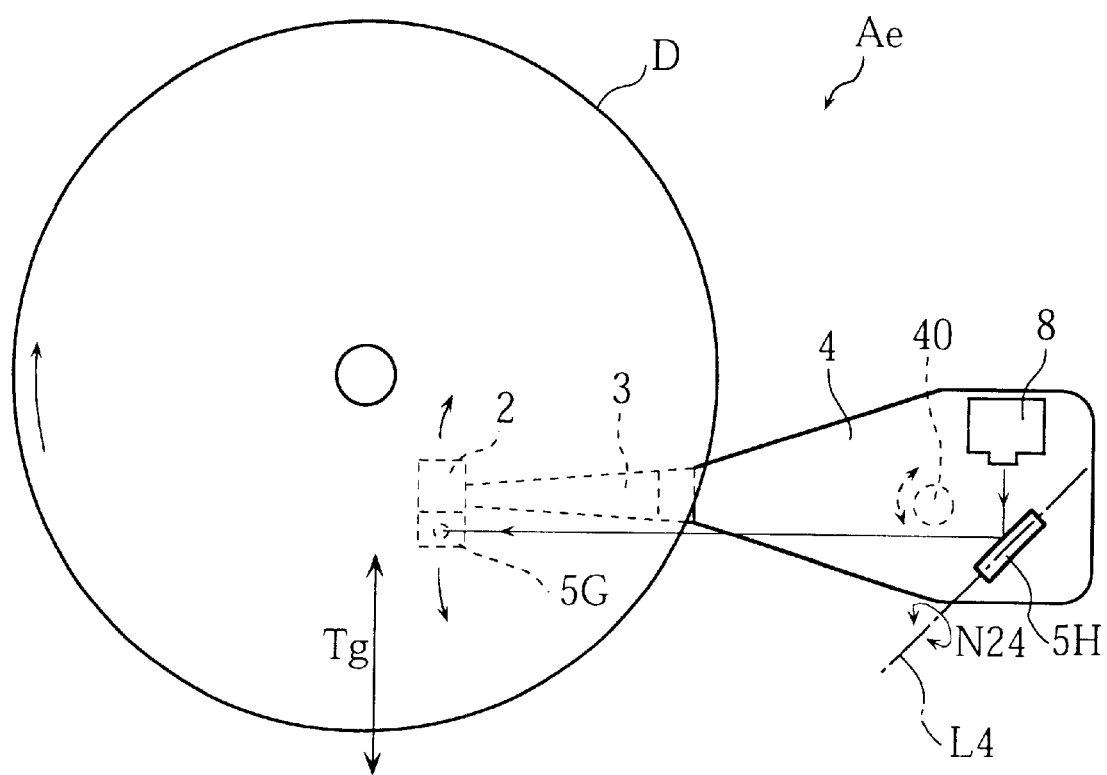
FIG. 23 is a plan view showing an optical disk apparatus according to a seventh embodiment of the present invention.

FIG. 23 shows an optical disk apparatus Ae according to a seventh embodiment of the present invention. The apparatus Ae includes a first mirror 5G carried by the suspension 3 and a second mirror 5H mounted on the rear end of the swing arm 4. The first mirror 5G is a stationary mirror, while the second mirror 5H is a single-axis galvano-mirror. The second mirror 5H is rotatable about the axis L4, as in the mirror 5F of the sixth embodiment.

Figure 24:
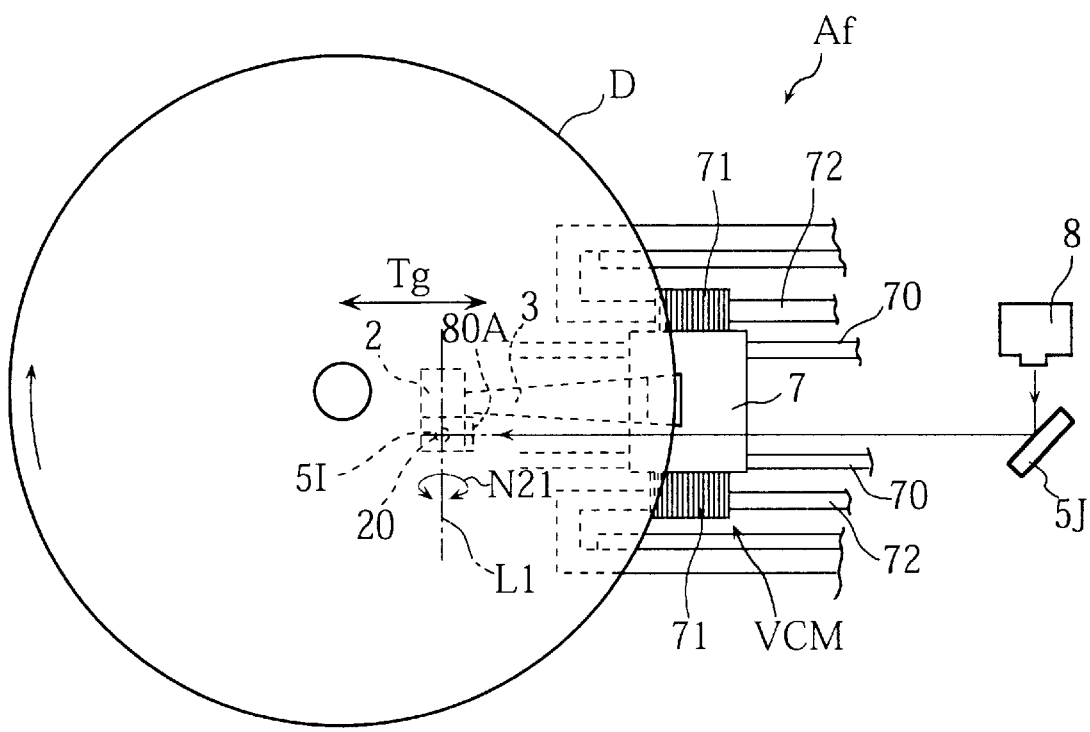
FIG. 24 is a plan view showing an optical disk apparatus according to an eighth embodiment of the present invention.
Figure 25:
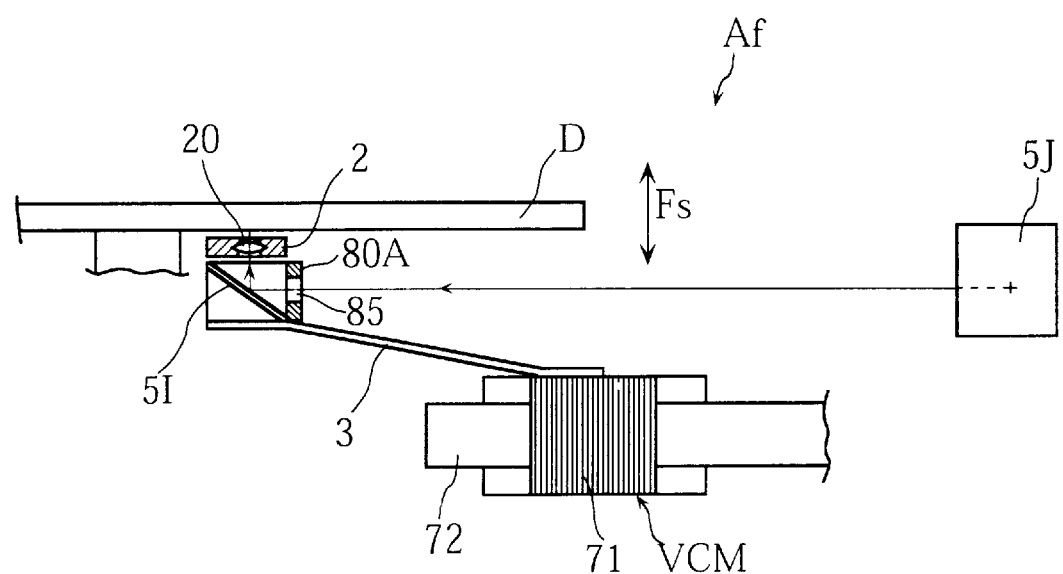
FIG. 25 is a side view showing the apparatus of FIG.24.
Figure 26:
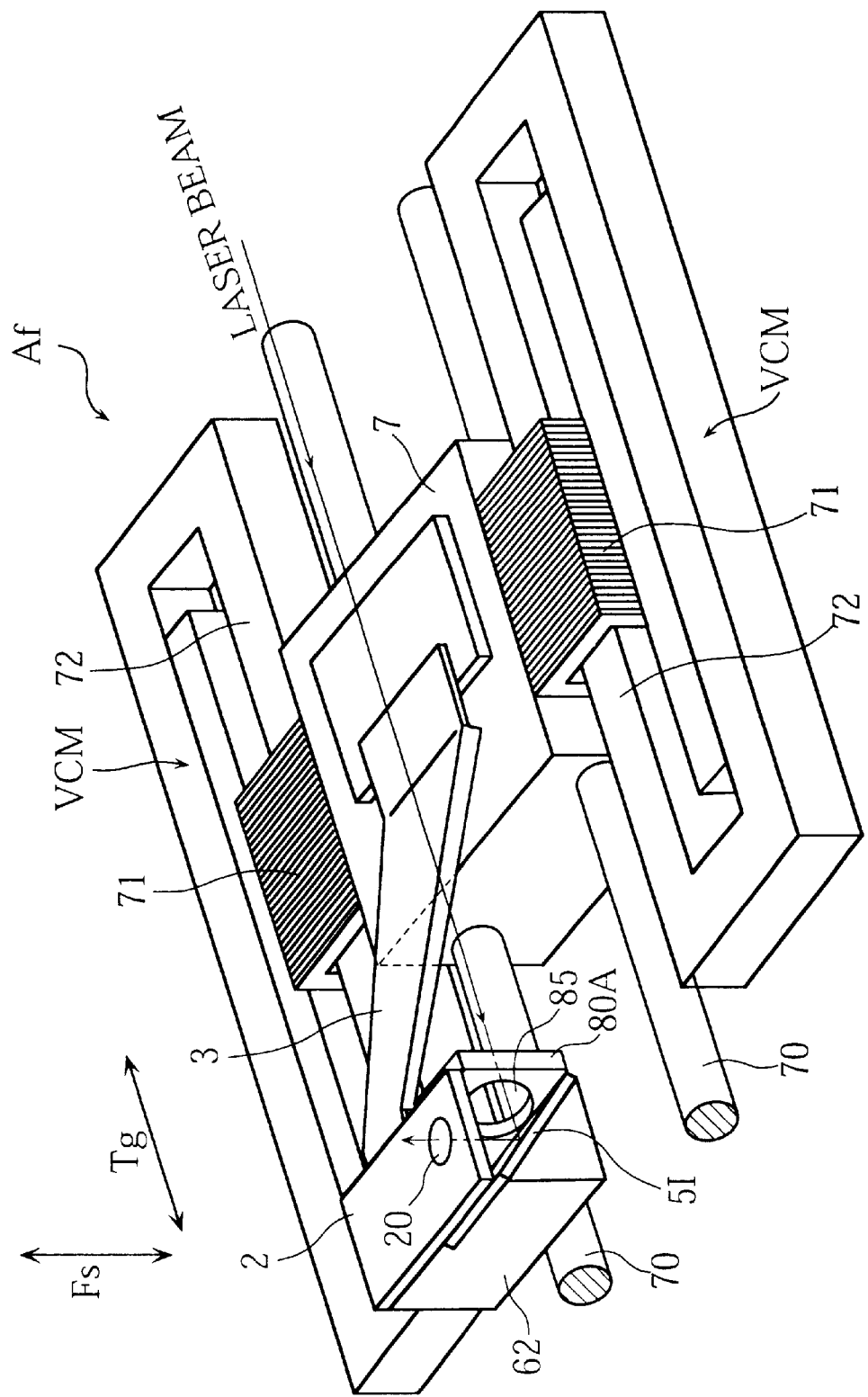
FIG. 26 is a perspective view showing a principal portion of the apparatus of FIG. 24.

FIGS. 24–26 show an optical disk apparatus Af according to an eighth embodiment of the present invention. Differing from the previous embodiments, the apparatus Af is provided with a linear seeking mechanism in place of the pivotable swing arm 4, as described below.

Referring to FIG. 26, the seek mechanism includes a carriage 7 to which a suspension 3 is fixed, a pair of guide rails 70 for supporting the carriage 7, and a pair of voice coil motors VCM for moving the carriage 7 in the tracking direction Tg. The paired voice coil motors VCM flank the carriage 7. Each of the motors VCM is provided with a coil 71 and a yoke 72 cooperating with the coil 71. As illustrated, the yoke 72 has a frame-like configuration elongated in the tracking direction Tg, and an inner straight part of the yoke 72 passes through the coil 71.

The suspension 3 carries, at its front end, a slider 2 and a mirror 5I and a photoelectric device 80A. The mirror 5I is a single-axis galvano-mirror rotatable about the axis L1 (see the arrow N21 in FIG. 24).

The apparatus Af is provided with a light emitting/detecting unit 8 and a stationary mirror 5J. The laser beam emitted from the unit 8 is reflected on the mirror 5J to be directed toward the galvano-mirror 5I. The light reflected on the mirror 5I enters a lens unit 20 supported by the slider 2.

In the apparatus Af, as shown in FIG. 24, the tracking direction Tg is in parallel to the path of the laser beam traveling from the stationary mirror 5J to the galvano-mirror 5I. Thus, when the light path deviates in the focusing direction Fs, the laser beam traveling from the galvano-mirror 5I to the lens unit 20 will shift in the tracking direction Tg.

As shown in FIG. 25 and 26, the photoelectric device 80A, arranged adjacent to the galvano-mirror 5I, is formed with a through-hole 85 for allowing the passage of the laser beam traveling from the stationary mirror 5J to the galvano-mirror 5I. Precisely, referring also to FIGS. 27A and 27B, the diameter d1 of the through-hole 85 is smaller than the diameter of the laser beam (see FIG. 27A in particular), but large enough to ensure that required data-writing or data-reading is properly performed with the supplied laser beam.

Figure 27A:
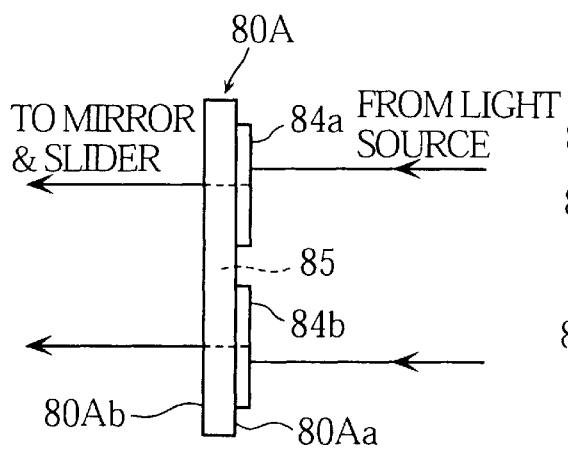
FIGS. 27A and 27B show a photoelectric device used for the apparatus of FIG. 24.
Figure 27B:
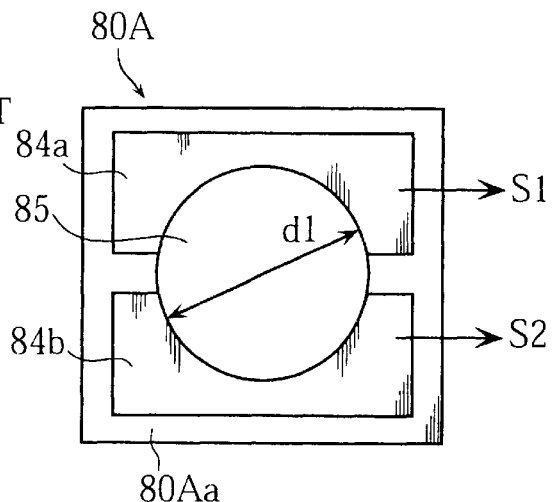

As shown in FIGS. 27A and 27B, the photoelectric device 80A includes a rectangular substrate having an obverse surface 80Aa and a reverse surface 80Ab. The obverse surface 80Aa faces the stationary mirror 5J (see also FIG. 25), while the reverse surface 80Ab faces the galvano-mirror 5I. The photoelectric device 80A also includes a first (upper) light-receiving element 84a and a second (lower) light receiving element 84b. As shown in FIG. 27B, each of the light receiving-elements 84a and 84b has a generally rectangular configuration a part of which is cut out by the through-hole 85. The two elements 84a, 84b are vertically spaced from each other.

The upper and the lower light-receiving elements 84a, 84b are designed to output appropriate detection signals S1 and S2, respectively, in accordance with the amount of received light. For instance, when the center of the laser beam coincides with the center of the through-hole 85, the amount of light received by the upper element 84a is equal to the amount of light received by the lower element 84b. Thus, the detection signal S1 is equal in strength to the other detection signal S2. On the other hand, when the laser beam deviates in the focusing direction Fs, there will be a difference in strength between the signals S1 and S2. Specifically, when the deviation is upward (downward), the signal S1 becomes stronger (weaker) than the signal S2.

Figure 28:
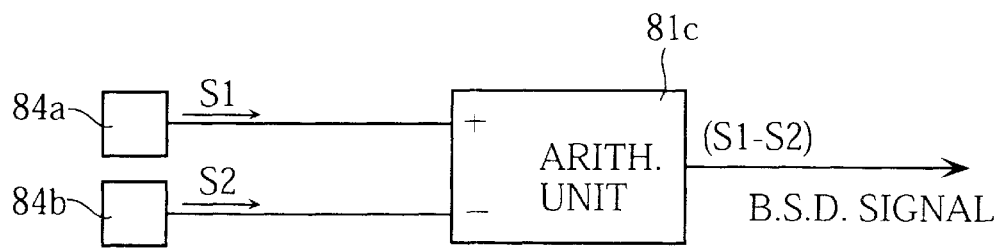
FIG. 28 is a block diagram showing a signal generating circuit used for the apparatus of FIG. 24.

According to the eighth embodiment, the light emitting/detecting unit 8 (see FIG. 24) is provided with an arithmetical unit 81c, as shown in FIG. 28. The arithmetical unit 81c generates beam shift detection signals by calculating the difference in strength between the signal S1 and the signal S2 supplied from the first and the second light-receiving elements 84a, 84b. When the difference "S1–S2" is positive, this means that the deviation of the laser beam is upward, while when it is negative, the deviation of the laser beam is downward. The extent or degree of the deviation depends on the absolute value of the difference "S1–S2".

Figure 29:
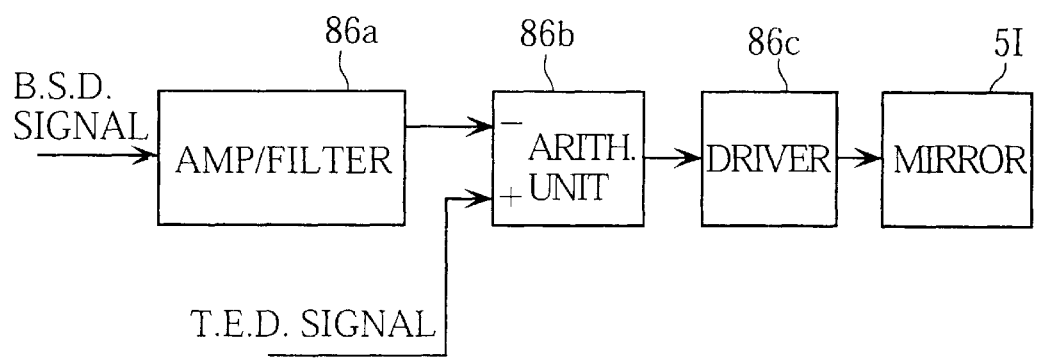
FIG. 29 is a block diagram showing a control system used for the apparatus of FIG. 24.

In the apparatus Af, as shown in FIG. 29, the beam shift detection signal supplied from the arithmetical unit 81c is amplified and then filtered by an amplifying/filtering device 86a. Then, the detection signal is sent to a second arithmetical unit 86b. This arithmetical unit 86b also receives a tracking error detection signal obtained on the basis of the returned light from the disk D. The tracking error detection signal may be obtained in a conventionally known manner. Based on both the beam shift detection signal and the tracking error detection signal, the arithmetical unit 86b supplies a tracking control signal to a driver 86c to rotate the galvano-mirror 5I about the axis L1 (FIG. 24).

In the apparatus Af of the eighth embodiment, the mirror 5I is a galvano-mirror, while the other mirror 5J is a stationary mirror. The present invention, however, is not limited to this. For instance, while the mirror 5I is stationary, the mirror 5J may be a galvano-mirror capable of swaying the reflected laser beam in the focusing direction Fs.

The photoelectric device 80A (FIG. 27) and the arithmetical unit 81c (FIG. 28) for performing beam shift detection may also be used for the optical disk apparatus A-Ae, whose seeking mechanism is a non-linear, swing-arm type.

Reference is now made to FIGS. 30–33 showing an optical disk apparatus Ag according to a ninth embodiment of the present invention. Though the apparatus Ag shown in FIG. 30 may seem to be similar to the apparatus Af shown in FIG. 26, a major difference is present in the structure of the suspension-supporting carriage 7.

The difference is that the carriage 7 of the apparatus Ag is provided with a mechanism for making fine adjustments to the position of the suspension 3 (hence the slider 2) in the tracking direction Tg, while the carriage 7 of the apparatus Af is not provided with such.

Figure 30:
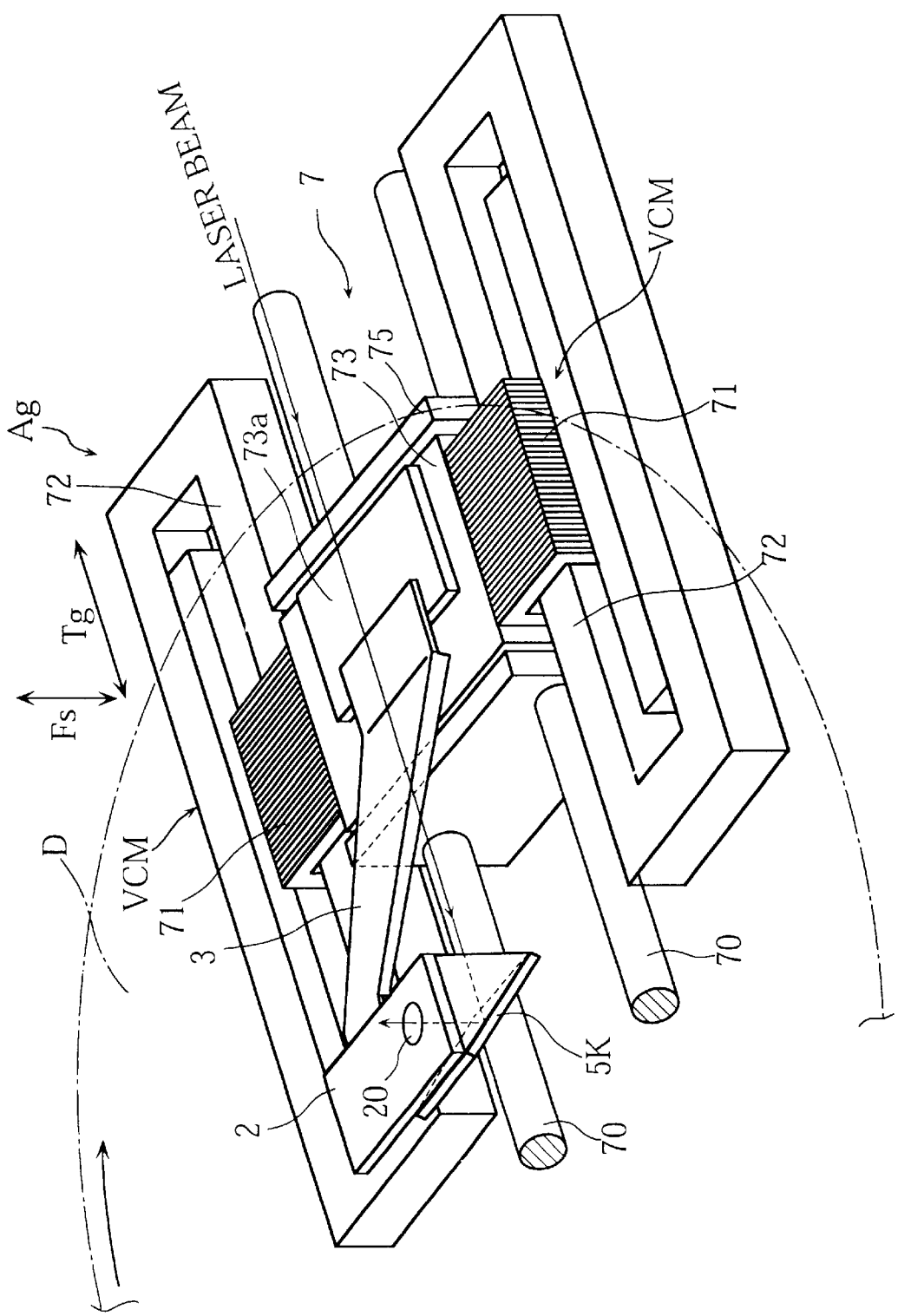
FIG. 30 is a perspective view showing a principal portion of an optical disk apparatus according to a ninth embodiment of the present invention.
Figure 31:
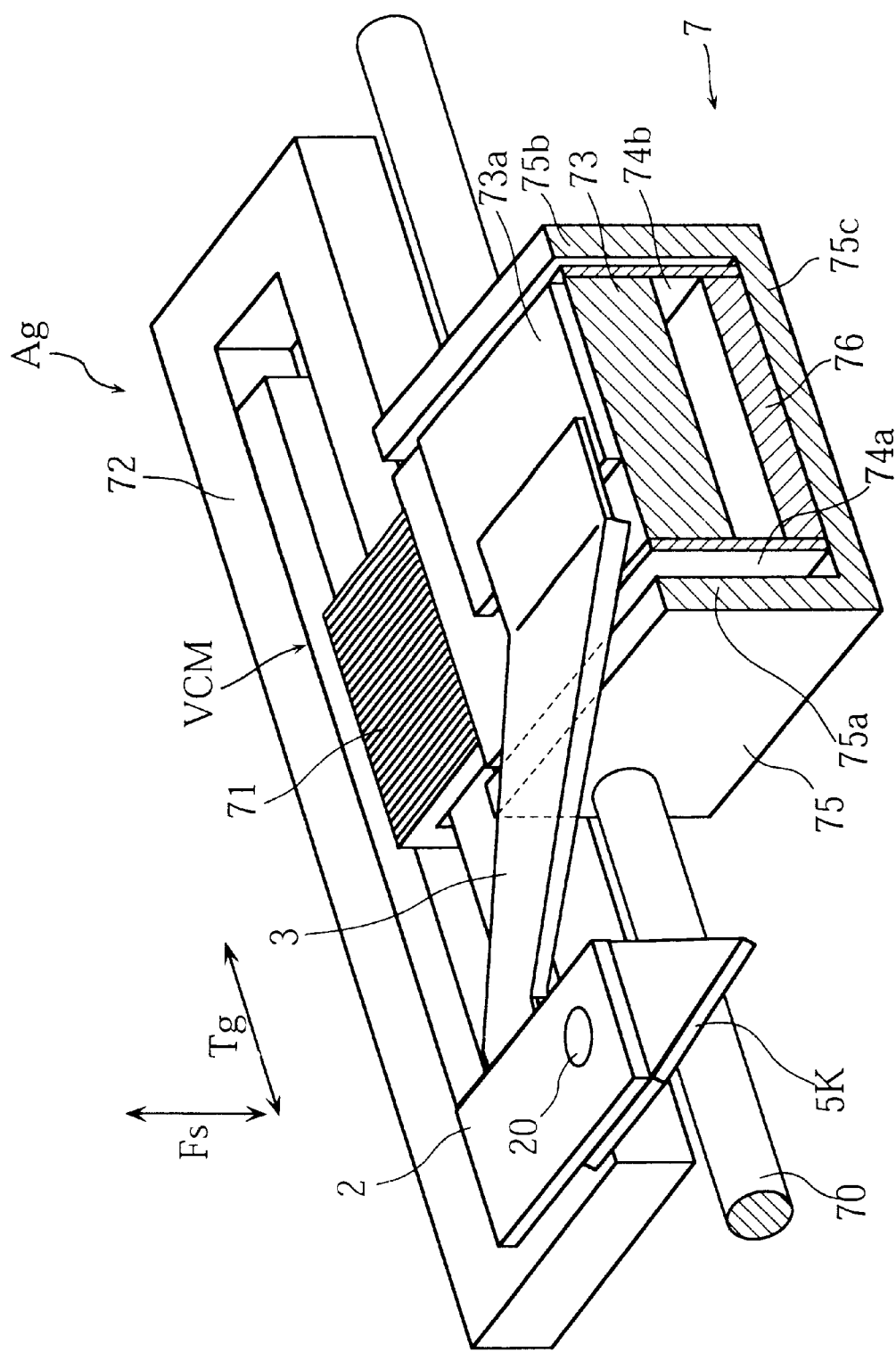
FIG. 31 is a perspective view showing the inside of the carriage shown in FIG. 30.
Figure 32:
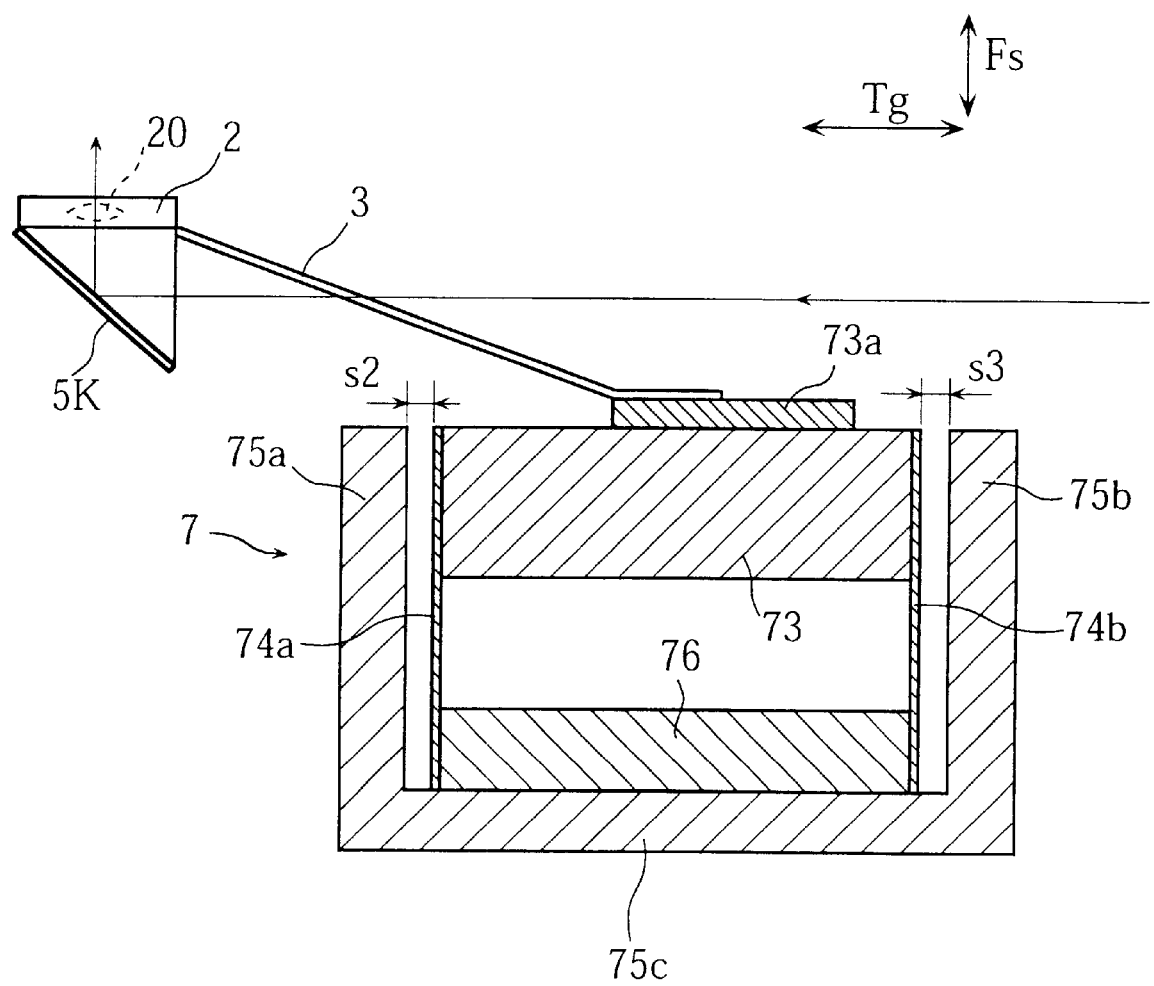
FIG. 32 is a sectional side view showing the carriage of FIG. 30.

Specifically, as shown in FIGS. 30–32, the carriage 7 includes a casing 75, a movable supporting plate 73, a base plate 76, a first leaf spring 74a and a second leaf spring 74b. The casing 75, having a generally U-shaped cross section, includes a first upright wall 75a, a second upright wall 75b and a bottom wall 75c. The base plate 76 is fixed to the bottom wall 75c of the casing 75. The movable supporting plate 73 is connected to the base plate 76 by the first and the second leaf springs 74a, 74b. As shown in FIG. 32, the first upright wall 75a is spaced from the first leaf spring 74a by a distance s2, while the second upright wall 75b is spaced from the second leaf spring 74b by a distance s3.

The suspension 3 is attached, at its rear end, to a fixing strip 73a which in turn is attached to the movable supporting plate 73. The suspension 3 carries, at its front end, a stationary mirror 5K together with the slider 2. The mirror 5K is realized by a slant surface of a triangular prism.

For moving the carriage 7 in the tracking direction Tg, the apparatus Ag is provided with two voice coil motors VCM, as in the apparatus Af shown in FIG. 26. As seen from FIGS. 30 and 31, the coil 71 of each motor VCM is fixed to the supporting plate 73 of the carriage 7.

In the apparatus Ag, the suspension 3 (hence the slider 2 and the mirror 5K) can be moved by the motors VCM in two different modes. In the first mode or fine adjustment mode, the suspension 3 is moved only a short distance in the tracking direction, while in the second mode or coarse adjustment mode, the suspension 3 is moved a longer distance, as described below.

Figure 33:
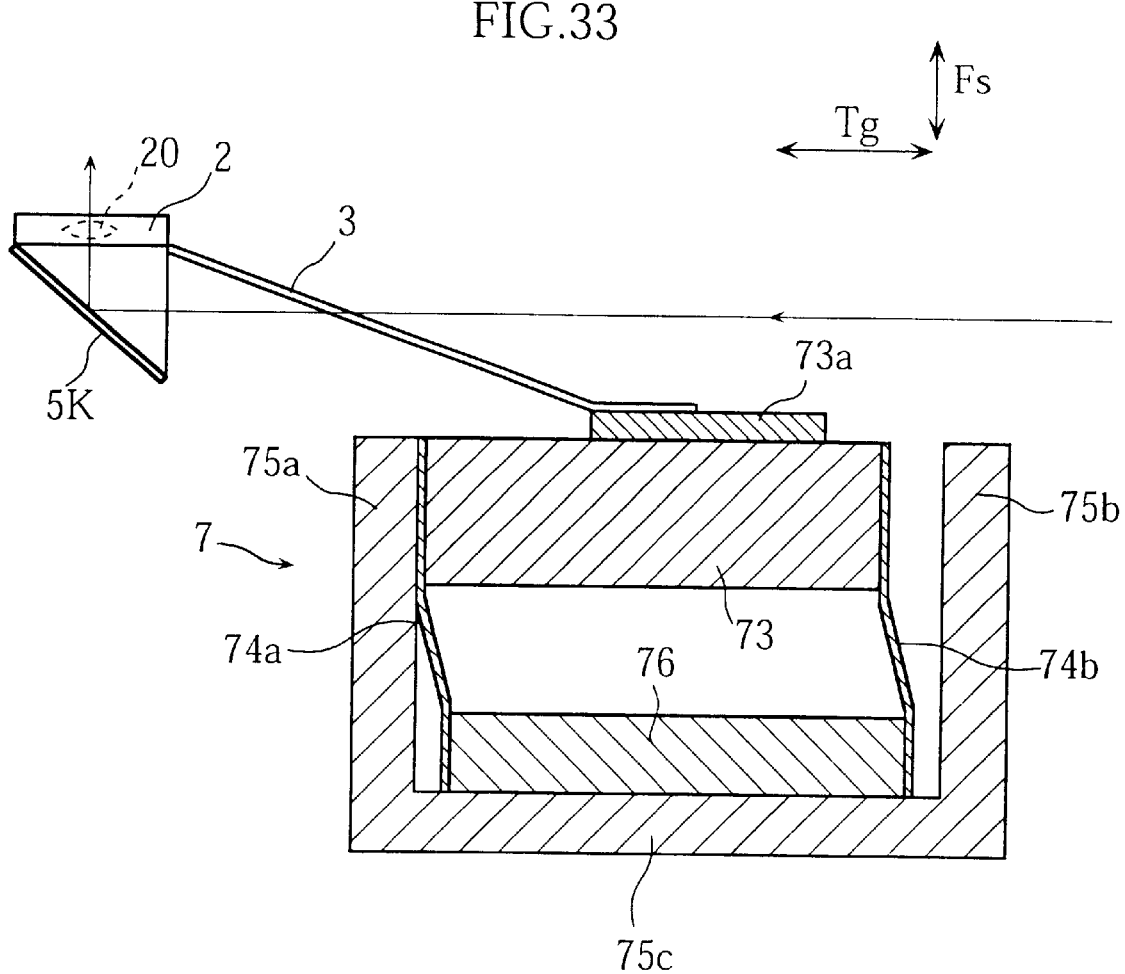
FIG. 33 is a sectional view illustrating the function of the carriage of FIG. 30 in a fine adjustment mode.

Specifically, it is assumed that the above-mentioned components of the carriage 7 are initially held in the positions shown in FIG. 32, where the first and the second leaf springs 74a, 74b are not bent. Starting from the initial state, in the fine adjustment mode, the supporting plate 73 is moved the distance s2 (or less) in the forward tracking direction, as shown in FIG. 33, or the distance s3 (or less) in the backward tracking direction. In this manner, fine positional adjustments of the slider 2 and the mirror 5K can be made, which makes it possible to perform tracking error correction based on a tracking error detection signal.

It should be noted that, in the fine adjustment mode, the casing 75 of the carriage 7 remains in the initial position while the other components of the carriage are moved in the tracking direction Tg. This is because the friction between the casing 75 and the two guide rails 70 is greater than the restoring force of the deformed leaf springs 74a and 74b.

In the coarse adjustment mode, the supporting plate 73 will be moved more than the distance s2 or s3 in the forward or backward tracking direction Tg. Thus, the carriage 7 as a whole is moved in the tracking direction Tg against the above-mentioned friction. Consequently, the slider 2 and the mirror 5K supported by the suspension 3 are moved a relatively long distance, so that the required seek operation is performed.

According to the ninth embodiment descried above, there is no need to use two kinds of actuators, one for performing the fine adjustment mode and the other for performing the coarse adjustment mode. Thus, the structure of the apparatus Ag is rendered simpler. Of course, in the ninth embodiment, a conventionally known fine actuator may be used for correcting the deviation of the laser beam due to the fluctuation of the disk D. In this case, the fine actuator may be operated to cause the light path extending between the suspension-supported mirror 5K and the objective lens unit 20 to shift in the direction parallel to the horizontal light path extending to the mirror 5K.

Figure 34:
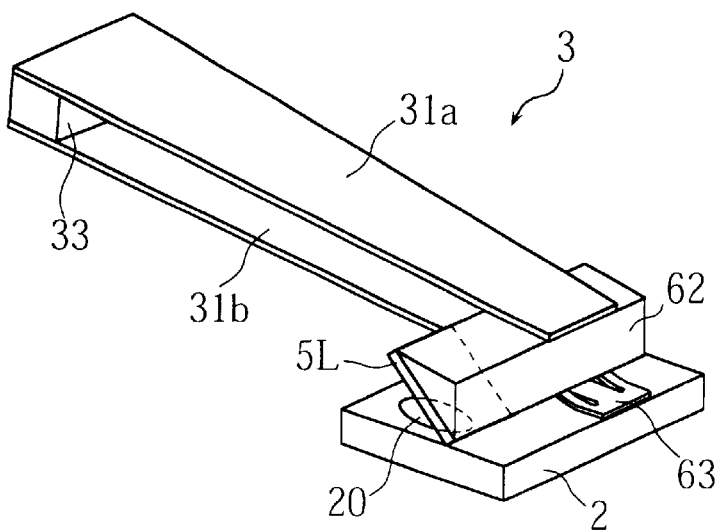
FIG. 34 is a perspective view showing an arm-slider assembly used for an optical disk apparatus according to a tenth embodiment of the present invention.
Figure 35:
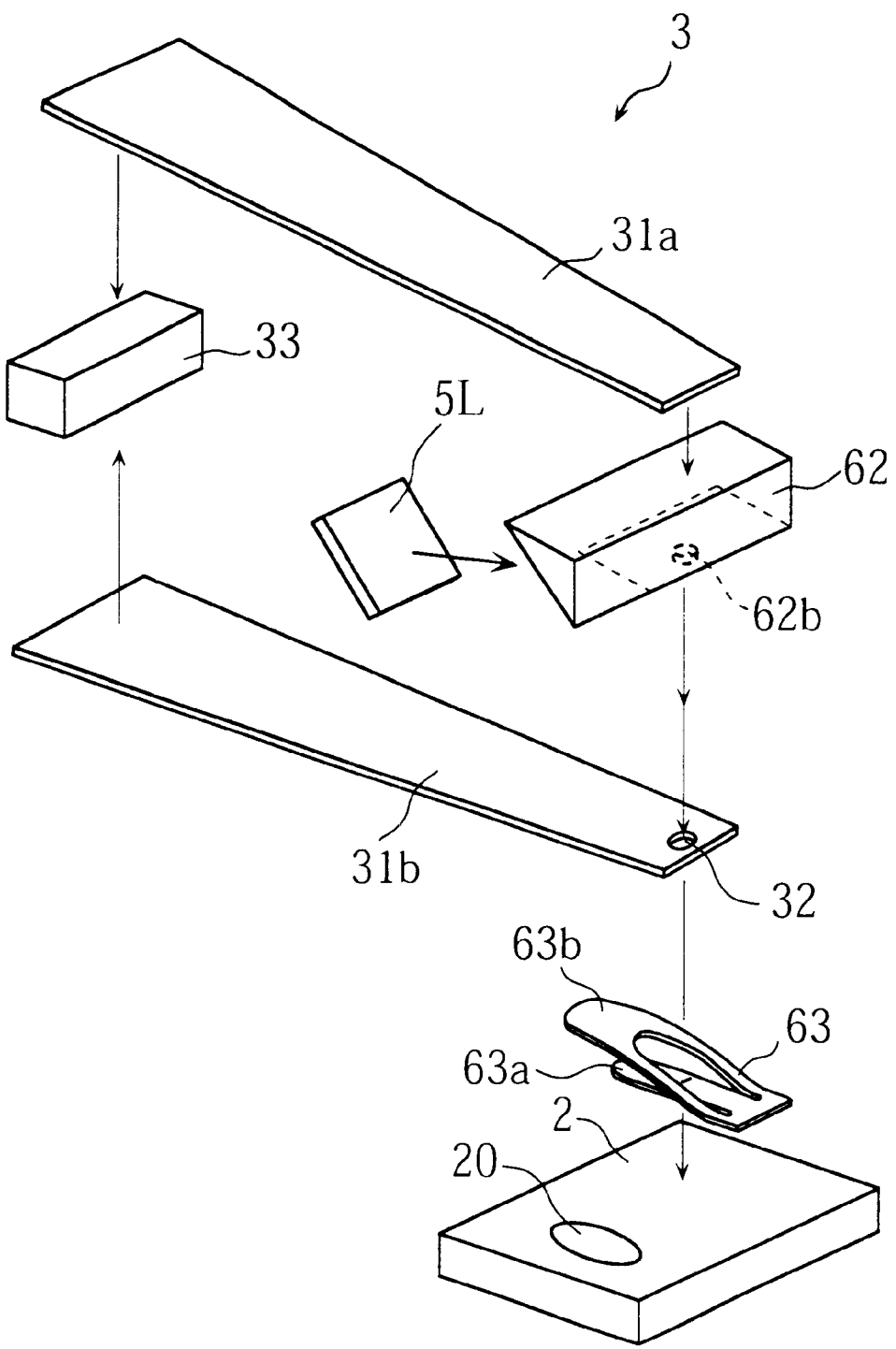
FIG. 35 is an exploded view showing the arm-slider assembly of FIG. 34.
Figure 36:
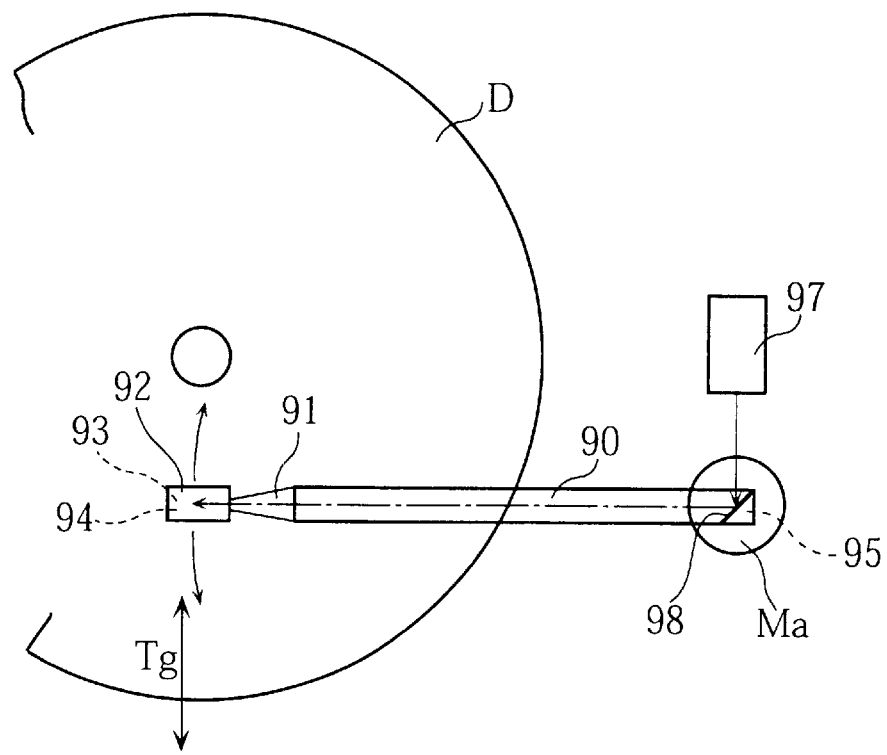
FIG. 36 is a plan view showing a conventional optical disk apparatus.
Figure 37:
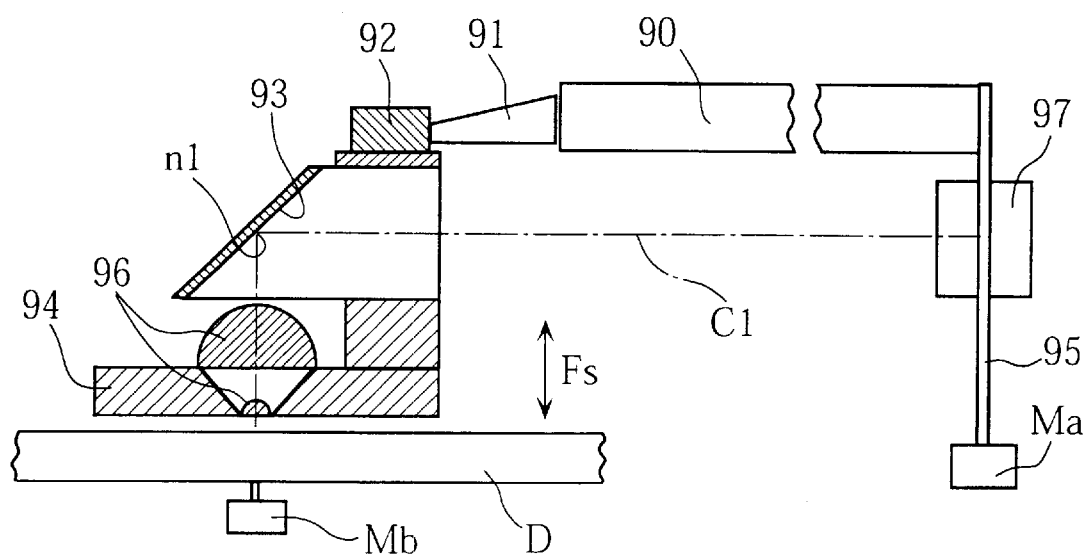
FIG. 37 is a side view showing, partially in section, the conventional apparatus.
Figure 38:
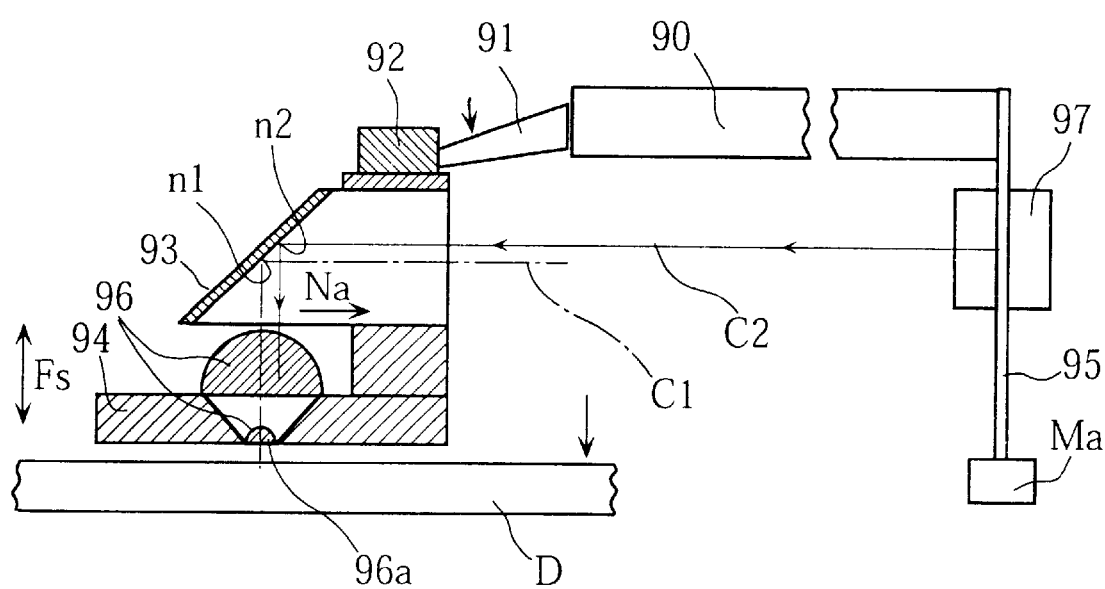
FIG. 38 illustrates the function of the conventional apparatus.

FIGS. 34 and 35 illustrate a slider-supporting structure of an optical disk apparatus according to a tenth embodiment of the present invention. In this embodiment, use is made of two appropriately flexible plates 31a and 31b to provide a suspension 3 which carries a slider 2 via a gimbal spring 63. As shown in FIG. 34, the upper plate 31a is uniformly spaced from the lower plate 31b by a spacer 33 and a lens holder 62. The spacer 33 is inserted between the rear ends of the plates 31a–31b, while the holder 62 is inserted between the font ends of the same plates. As shown in FIG. 35, the holder 62 supports a mirror 5L attached thereto. The holder 62 is formed with a pivot projection 62b which is inserted into a through-hole 32 formed in the front end of the lower plate 31b. Partially protruding from the through-hole 32, the projection 62b comes into contact with the central strip 63a of the gimbal spring 63. The central strip 63a is fixed to the slider 2, while the outer portion 63b of the gimbal spring 63 is fixed to the lower plate 31b.

According to the tenth embodiment, the two parallel plates 31a, 31b render the suspension 3 to be vertically flexible (as viewed in FIG. 34) but horizontally stiff. Thus, no unfavorable vibration will be generated in the suspension 3 during e.g. a seek operation, which is advantageous to supporting the slider 2 and the mirror 5L stably.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An optical disk apparatus comprising:

a light source for emitting a laser beam;

an objective for focusing the laser beam;

a slider holding the objective and arranged to float relative to an optical disk;

a suspension for supporting the slider;

a first mirror supported by the suspension and spaced from the slider in a focusing direction, the first mirror being arranged to reflect the laser beam traveling in a first direction which is non-parallel to the focusing direction, so that the reflected laser beam enters the objective; and a seek mechanism for moving the suspension so that the first mirror and the slider are moved in a tracking direction;

wherein the first mirror is rotatable about a first axis for causing the reflected laser beam to shift in the first direction; and wherein the first mirror is rotatable about a second axis which is non-parallel to the first axis for causing the reflected laser beam to shift in a second direction which is non-parallel to the first direction.

2. The apparatus according to claim 1, further comprising a second mirror for reflecting the laser beam between the light source and the first mirror, the second mirror being rotatable about a third axis for causing the reflected laser beam to shift in a third direction which is non-parallel to the first direction.

3. An optical disk apparatus comprising:

a light source for emitting a laser beam;

an objective for focusing the laser beam;

a slider holding the objective and arranged to float relative to an optical disk;

a suspension for supporting the slider;

a first mirror supported by the suspension and spaced from the slider in a focusing direction. the first mirror being arranged to reflect the laser beam traveling in a first direction which is non-parallel to the focusing direction, so that the reflected laser beam enters the objective;

a seek mechanism for moving the suspension so that the first mirror and the slider are moved in a tracking direction; and a second mirror disposed between the light source and the first mirror for reflecting the laser beam emitted by the light source toward the first mirror;

wherein the second mirror is rotatable about a first axis for causing the reflected laser beam to shift in the focusing direction; and wherein the second mirror is rotatable about a second axis for causing the reflected laser beam to shift in a second direction which is non-parallel to the first direction.

4. The apparatus according to claim 3, wherein the seek mechanism includes a swing arm for moving the suspension in the tracking direction, the first direction being non-parallel to the tracking direction.

5. The apparatus according to claim 4, further comprising a detector for receiving the laser beam which is reflected on the disk and returned along a return path, the detector being designed to generate a tracking error detection signal when the return path deviates in a tracking error direction, the detector being designed to generate a beam shift detection signal when the return path deviates in a beam shift direction.

6. The apparatus according to claim 5, wherein the detector is provided with a photoelectric device and an arithmetical unit, the photoelectric device including at least first to fourth light-receiving elements, the first and the second light-receiving elements being spaced from the third and the fourth light-receiving elements in the beam shift detection, the first and the third light-receiving elements being spaced from the second and the fourth light-receiving elements in the tracking error direction, the arithmetical unit being arranged to generate the tracking error detection signal based on a difference between a sum of signals from the first and the third light-receiving elements and a sum of signals from the second and the fourth light-receiving elements, the arithmetical unit being arranged to generate the beam shift detection signal based on a difference between a sum of signals from the first and the second light-receiving elements and a sum of signals from the third and the fourth light-receiving elements.

7. The apparatus according to claim 3, wherein the seek mechanism causes the suspension to be moved linearly in the tracking direction, the first direction coinciding with the tracking direction.

8. The apparatus according to claim 3, further comprising a photoelectric device supported by the suspension, wherein the photoelectric device is formed with a through-hole for allowing passage of the laser beam, the photoelectric device being designed to detect deviation of the laser beam relative to the through-hole in the focusing direction.

9. The apparatus according to claim 8, wherein the photoelectric device is provided with at least two light-receiving elements spaced from each other in the focusing direction, the through-hole intervening between the two light-receiving elements.

10. The apparatus according to claim 9, further comprising an arithmetical unit designed to generate a beam shift detection signal based on a difference between signals supplied from the light-receiving elements.

11. An optical disk apparatus comprising:

a light source for emitting a laser beam;

an objective for focusing the laser beam;

a slider holding the objective and arranged to float relative to an optical disk;

a suspension for supporting the slider;

a mirror supported by the suspension and spaced from the slider in a focusing direction, the mirror being arranged to reflect the laser beam traveling in a direction which is non-parallel to the focusing direction, so that the reflected laser beam enters the objective; and a seek mechanism for moving the suspension so that the mirror and the slider are moved in a tracking direction;

wherein the seek mechanism includes a carriage guide extending in the tracking direction, and a carriage movably guided by the carriage guide; and wherein the carriage includes a casing having a front wall and a rear wall, a suspension carrier loosely accommodated in the casing via an elastic connector and connected to the suspension, and a driver connected to the suspension carrier, the elastic connector causing the suspension carrier to be normally spaced from the front and rear walls of the casing, the driver causing the suspension carrier to move into contact with a selected one of the front and rear walls of the casing.

12. The apparatus according to claim 11, wherein the driver comprises a voice coil motor for driving the carriage along the carriage guide.

13. The apparatus according to claim 12, wherein the carriage further comprises a base member fixed to the casing, the elastic connector including a parallel pair of leaf springs connecting the suspension carrier to the base member.

14. The apparatus according to claim 11, further comprising a mirror holder supported by the suspension, and a gimbal spring arranged between the mirror holder and the slider so that the slider is pivotable on the mirror holder.

15. The apparatus according to claim 11, wherein the suspension includes two flexible plates held in parallel to each other.

16. A galvano-mirror comprising:

a mirror plate provided with a light reflector;

a supporting member for supporting the mirror plate;

a torsion bar for connecting the mirror plate to the supporting member in a cantilever manner, the torsion bar being twistable about a first axis;

first actuating means for rotating the mirror plate about the first axis of the torsion bar; and second actuating means for rotating the mirror plate about a second axis which is non-parallel to the first axis.

17. An optical disk apparatus comprising:

a light source for emitting a laser beam;

an objective for focusing the laser beam;

a slider holding the objective and arranged to float relative to an optical disk;

a suspension for supporting the slider;

a first mirror supported by the suspension and spaced from the slider in a focusing direction, the first mirror being arranged to reflect the laser beam traveling in a first direction which is non-parallel to the focusing direction, so that the reflected laser beam enters the objective;

a seek mechanism for moving the suspension so that the first mirror and the slider are moved in a tracking direction;

a second mirror disposed between the light source and the first mirror for reflecting the laser beam emitted by the light source toward the first mirror; and a detector for receiving the laser beam which is reflected on the disk and returned along a return path, the detector being designed to generate a tracking error detection signal when the return path deviates in a tracking error direction, the detector being designed to generate a beam shift detection signal when the return path deviates in a beam shift direction;

wherein the second mirror is rotatable about a first axis for causing the reflected laser beam to shift in the focusing direction; and wherein the detector is provided with a photoelectric device and an arithmetical unit, the photoelectric device including at least first to fourth light-receiving elements, the first and the second light-receiving elements being spaced from the third and the fourth light-receiving elements in the beam shift detection, the first and the third light-receiving elements being spaced from the second and the fourth light-receiving elements in the tracking error direction, the arithmetical unit being arranged to generate the tracking error detection signal based on a difference between a sum of signals from the first and the third light-receiving elements and a sum of signals from the second and the fourth light-receiving elements, the arithmetical unit being arranged to generate the beam shift detection signal based on a difference between a sum of signals from the first and the second light-receiving elements and a sum of signals from the third and the fourth light-receiving elements.

* * * * *